(12) United States Patent
Centonza et al.

(10) Patent No.: US 9,462,513 B2
(45) Date of Patent: Oct. 4, 2016

(54) NODE AND METHOD FOR PROVIDING AN INTERFACE BETWEEN BASE STATION

(71) Applicant: Telefonaktiebolaget L M Ericsson (publ), Stockholm (SE)

(72) Inventors: Angelo Centonza, Winchester (GB); Fredrik Gunnarsson, Linköping (SE); Niklas Johansson, Sollentuna (SE); Oumer Teyeb, Solna (SE); Stefan Wagner, Espoo (FI); Pontus Wallentin, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/009,128

(22) PCT Filed: Jul. 15, 2013

(86) PCT No.: PCT/SE2013/050906
§ 371 (c)(1),
(2) Date: Oct. 1, 2013

(87) PCT Pub. No.: WO2014/021763
PCT Pub. Date: Feb. 6, 2014

(65) Prior Publication Data
US 2014/0080484 A1  Mar. 20, 2014

Related U.S. Application Data

(60) Provisional application No. 61/678,772, filed on Aug. 2, 2012.

(51) Int. Cl.
*H04W 36/00* (2009.01)
*H04W 76/04* (2009.01)
(Continued)

(52) U.S. Cl.
CPC ..... *H04W 36/0055* (2013.01); *H04W 36/0072* (2013.01); *H04W 36/24* (2013.01); *H04W 76/045* (2013.01); *H04W 36/0027* (2013.01); *H04W 36/04* (2013.01); *H04W 36/28* (2013.01)

(58) Field of Classification Search
CPC ..... H04W 4/00; H04W 40/00; H04W 36/00; H04W 7/14
See application file for complete search history.

(56) References Cited

U.S. PATENT DOCUMENTS

2009/0170426 A1* 7/2009 Jung ............... H04W 8/24 455/7
2009/0186613 A1  7/2009 Ahn et al.
(Continued)

FOREIGN PATENT DOCUMENTS

WO  2010003501 A2  1/2010
WO  2011120559 A1  10/2011

OTHER PUBLICATIONS

Luo et al., "A CoMP sogt handover scheme for LTE systmes in high speed railway," EURAAIP Journal on Wireless Communications and Networking 2012, Jun. 13, 2012, pp. 1-9.*
(Continued)

*Primary Examiner* — Myron K Wyche
(74) *Attorney, Agent, or Firm* — Murphy, Bilak & Homiller, PLLC

(57) ABSTRACT

Example embodiments are directed towards establishing a base station (401A) to base station (401B) interface for receiving and sending communications on the interface for providing bearer management functions for bearers associated with a user equipment (101) in multiple connectivity with at least two base stations.

24 Claims, 20 Drawing Sheets

(51) Int. Cl.
*H04W 36/24* (2009.01)
*H04W 36/28* (2009.01)
*H04W 36/04* (2009.01)

(56) References Cited

U.S. PATENT DOCUMENTS

| | | | |
|---|---|---|---|
| 2009/0225723 A1 | 9/2009 | Tenneti et al. | |
| 2010/0062774 A1 | 3/2010 | Motegi et al. | |
| 2010/0157944 A1 | 6/2010 | Horn et al. | |
| 2010/0265912 A1* | 10/2010 | Mildh et al. | 370/331 |
| 2010/0303039 A1 | 12/2010 | Zhang et al. | |
| 2010/0304682 A1 | 12/2010 | Choi et al. | |
| 2011/0086639 A1 | 4/2011 | Kalervo Hamalainen et al. | |
| 2011/0113299 A1* | 5/2011 | Power et al. | 714/748 |
| 2011/0158121 A1 | 6/2011 | Casati et al. | |
| 2011/0194462 A1 | 8/2011 | Wu et al. | |
| 2011/0207456 A1 | 8/2011 | Radulescu et al. | |
| 2011/0268007 A1 | 11/2011 | Barany et al. | |
| 2011/0274087 A1 | 11/2011 | Liang et al. | |
| 2012/0076121 A1 | 3/2012 | Choi et al. | |
| 2012/0088505 A1 | 4/2012 | Toh et al. | |
| 2012/0100858 A1 | 4/2012 | Qin | |
| 2012/0106388 A1* | 5/2012 | Shimezawa et al. | 370/252 |
| 2012/0108240 A1 | 5/2012 | Liu et al. | |
| 2012/0165013 A1 | 6/2012 | Nishida et al. | |
| 2012/0182912 A1* | 7/2012 | Watfa et al. | 370/311 |
| 2013/0070731 A1 | 3/2013 | Lim et al. | |
| 2013/0107863 A1 | 5/2013 | Faccin et al. | |
| 2013/0143574 A1* | 6/2013 | Teyeb | H04W 36/0011 455/438 |
| 2013/0170474 A1 | 7/2013 | Bi et al. | |
| 2013/0176853 A1 | 7/2013 | Mahr | |
| 2013/0201904 A1* | 8/2013 | Toskala | H04W 36/165 370/315 |
| 2013/0260811 A1* | 10/2013 | Rayavarapu | H04W 76/028 455/509 |
| 2013/0272268 A1 | 10/2013 | Xu et al. | |
| 2013/0322325 A1 | 12/2013 | Hahn et al. | |
| 2013/0337812 A1 | 12/2013 | Pekonen et al. | |
| 2014/0211619 A1 | 7/2014 | Suryavanshi et al. | |
| 2014/0213264 A1 | 7/2014 | Park et al. | |
| 2014/0219248 A1 | 8/2014 | Reddiboyana et al. | |
| 2014/0357274 A1 | 12/2014 | Teng et al. | |

OTHER PUBLICATIONS

Luo, W., et al., "A CoMP soft handover scheme for LTE systems in high speed railway," EURASIP Journal on Wireless Communications and Networking 2012. Jun. 13, 2012. pp. 1-5.

3GPP, "3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 11)", 3GPP TS 29.274 V11.3.0, Jun. 2012, 1-219.

3GPP, "3rd Generation Partnership Project; Technical Specification Group Radio Access Network; Evolved Universal Terrestrial Radio Access Network (E-UTRAN); S1 Application Protocol (S1AP) (Release 10)", 3GPP TS 36.413 V10.2.0, Jun. 2011, 1-253.

* cited by examiner

NODE AND METHOD FOR PROVIDING AN INTERFACE BETWEEN BASE STATION

TECHNICAL FIELD

Example embodiments presented herein are directed towards a base station, and corresponding methods therein, for establishing a base station to base station interface for sending and receiving communications related to bearer management functions for bearers associated with a user equipment in multiple connectivity.

BACKGROUND

With the proliferation of user friendly smart phones and tablets, the usage of high data rate services such as video streaming over the mobile network is becoming common place, greatly increasing the amount of traffic in mobile networks. Thus, there is a great urgency in the mobile network community to ensure that the capacity of mobile networks keeps increasing along with the ever-increasing user demand. The latest systems such as Long Term Evolution (LTE), especially when coupled with interference mitigation techniques, have spectral efficiencies very close to the theoretical Shannon limit. The continuous upgrading of current networks to support the latest technologies and densifying the number of base stations per unit area are two of the most widely used approaches to meet the increasing traffic demands.

Yet another approach that is gaining high attention is to use Heterogeneous Networks where the traditional pre-planned macro base stations (known as the macro layer) are complemented with several low-powered base stations that may be deployed in a relatively unplanned manner. The 3rd Generation Partnership Project (3GPP) has incorporated the concept of Heterogeneous Networks as one of the core items of study in the latest enhancements of LTE, such as LTE release 11 and several low-powered base stations for realizing heterogeneous networks such as pico base stations, femto base stations (also known as home base stations or HeNBs), relays, and RRHs (remote radio heads) have been defined. The initial discussion for LTE release 12 has already started and one of the proposed items for study is the possibility of serving a user equipment (UE) from more than one eNB simultaneously. The current legacy handover mechanisms of LTE have to be updated in order to support this.

FIG. 1 provides an example of a heterogeneous network where a mobile terminal 101 uses multiple flows, e.g. an anchor flow from the macro base station (or "anchor eNB") 401A and a assisting flow from a pico base station (or a "assisting eNB") 401B. One of the problems in using a heterogeneous network is how to map the user plane bearers on the anchor flow and assisting flow, respectively. The simple solution is that each bearer is mapped on a single flow, for example, the first bearer uses the anchor flow and the second bearer uses the assisting flow.

SUMMARY

LTE currently supports only one to one connections between user equipments and eNBs. As such, when a handover is initiated, the target is asked to admit all the bearers of the user equipment. If for some reason, such as overload situation, some of the bearers are unable to be admitted at the target, the source may either cancel the handover (and possibly try another candidate target) or accept it and handover the user equipment to the target, which will result in the dropping of the non-admitted bearers. This may have severe consequences on the overall experience of the user. Furthermore, the handover procedures specified in 3GPP are aimed at keeping the user equipment connected to only one cell. Namely, when a handover procedure is completed, the user equipment moves all or part of its data and signaling bearers to the target, leaving no further communication with the source.

With the advent of soft cells, new handover mechanisms (triggering, preparation, execution) that may take advantage of the possibility to connect a user equipment to multiple eNBs at the same time are required. In fact, current specifications do not allow to setup bearers in parallel and in multiple eNBs for the same user equipment. This would allow an optimal distribution of bearers depending on their QoS and UL/DL requirements. Furthermore, current specifications provide many communications between the source and target to go through a mobility management node (e.g., a MME, SGSN, or S4-SGSN). A need exists to efficiently management such handover mechanisms.

According to some of the example embodiments, an interface is established to provide direct communications between two base stations serving a same user equipment. The example embodiments presented herein make it possible to perform handovers selectively between a source and a target eNB, thereby creating more system flexibility than the legacy way of performing handover where a user equipment is completely handed over to the target.

An example advantage of some of the example embodiments is providing the possibility to keep all the user equipment bearers ongoing as the bearers that the target was not able to admit may be kept at the source. A further example advantage is providing the possibility to trigger handovers at a bearer level rather than at a user equipment level. For example, the source eNB may keep the bearers that may not tolerate discontinuity such as VoIP services with itself until the radio conditions of the source are at much lower quality than the target, while bearers that are very capacity hungry but more tolerant to interruptions such as file download can be handed over to the target even if the radio conditions at the source are not that bad.

A further example advantage is providing the possibility to maintain a control plane at one eNB, while sharing the data load at several eNBs. This opens several opportunities such as network sharing. For example, several operators may share the pico nodes for data bearers, while maintaining the signaling radio bearers only at their macros. Another example advantage may be providing the possibility of control plane diversity. For example, the sending of a handover command from the source and/or target or the sending of the measurement report towards target becomes rather straightforward with multiple connectivity.

A further example advantage may be RLF on the assisting or anchor node may be recovered faster. Assisting node recovery is straightforward as the user equipment context resides at the anchor, and anchor recovery also becomes fast as the assisting node may fetch the context easily from the network. It should be appreciated that while a selective handover scenario is provided as an example use for such an interface, the example embodiments are not limited to selective handovers.

Accordingly, some of the example embodiments may be directed towards a method, in a first base station, for providing an interface between the first base station and a second base station. The first and second base stations comprise an anchor-assisting node relationship and are comprised in a wireless communications network. The method comprises establishing the interface with the second base station. The method further comprises receiving and/or sending communications from and/or to, the second base station, respectively, on the interface for providing bearer management functions for bearers associated with a user equipment in multiple connectivity with at least the first and second base stations.

Some of the example embodiments may be directed towards a first base station for providing an interface between the first base station and a second base station. The first and second base stations comprise an anchor-assisting node relationship and are comprised in a wireless communications network. The first base station comprises processing circuitry configured to establish the interface with the second base station. The first base station also comprises radio circuitry configured to receive and/or send communications from and/or to, the second base station, respectively, on the interface to provide bearer management functions for bearers associated with a user equipment in multiple connectivity with at least the first and second base stations.

DEFINITIONS

3GPP 3rd Generation Partnership Project
AMBR Aggregate Maximum Bit Rate
AP Application Protocol
APN Access Point Name
ARP Allocation and Retention Priority
ARQ Automatic Repeat reQuest
BCH Broadcast Channel
CIO Cell Individual Offset
CN Core Network
CRS Cell specific Reference Symbol
CSG Closed Subscriber Group
DL Downlink
DM Demodulation
DRB Data Radio Bearer
E-RAB E-UTRAN Radio Access Bearers
E-UTRA Evolved Universal Terrestrial Radio Access
E-UTRAN Evolved UMTS Terrestrial Radio Access Network
eNB/eNodeB enhanced Node B (base station)
EPC Evolved Packet Core
EPS Evolved Packet System
EMM Evolved Packet System Connection Management
GBR Guaranteed Bit Rate
GUMMEI Globally Unique Mobility Management Entity Identifier
HARQ Hybrid Automatic Repeat reQuest
HeNB Home eNB
HO Handover
HOM Handover Margin
HSPA High-Speed Packet Access
IE Information Element
ID Identity
IP Internet Protocol
LTE Long Term Evolution
MAC Medium Access Control
MBR Maximum Bit Rate
MME Mobility Management Entity
MTCP Multi-path Transmission Control Protocol
NAS Non-Access Stratum
OAM Operation and Maintenance
PGW PDN Gateway
PBCH Physical Broadcast CHannel
PCell Primary Cell
PCFICH Physical Control Format Indicator CHannel
PCI Physical Cell Identity
PDCCH Physical Downlink Control CHannel
PDCP Packet Data Convergence Protocol
PDN Packet Data Network
PDSCH Physical Downlink Shared CHannel
PDU Packet Data Unit
PHICH Physical Hybrid ARQ Indicator CHannel
PSS Primary Synchronization Signal
QCI QoS Class Identifier
QoS Quality of Service
RLC Radio Link Control
RAB Radio Access Bearer
RAT Radio Access Technology
RE Resource Element
RLC Radio Link Control
RLF Radio Link Failure
RRC Radio Resource Control
RRH Remote Radio Head
RRM Radio Resource Management
RS Reference Signal
RSCP Received Signal Code Power
RSRP Reference Signal Received Power
RSRQ Reference Signal Received Quality
Rx Receive
SGW Serving Gateway
SCell Secondary Cell
SCTP Stream Control Transmission Protocol
SDF Service Data Flow
SDU Service Data Unit
SFN System Frame Number
SINR Signal to Interference plus Noise Ratio
SRB Signaling Radio Bearer
SRVCC Single Radio Voice Call Continuity
SSS Secondary Synchronization Signal
TCP Transmission Control Protocol
TTT Time To Trigger
Tx Transmit
UE User Equipment
UL Uplink
UMTS Universal Mobile Telecommunications System
UTRA Universal Terrestrial Radio Access
UTRAN Universal Terrestrial Radio Access Network
VoIP Voice over Internet Protocol

BRIEF DESCRIPTION OF THE DRAWINGS

The foregoing will be described in more detail with from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

In the following description, for purposes of explanation and not limitation, specific details are set forth, such as particular components, elements, techniques, etc. in order to provide a thorough understanding of the example embodiments presented herein. However, the example embodiments may be practiced in other manners that depart from these specific details. In other instances, detailed descriptions of well-known methods and elements are omitted so as not to obscure the description of the example embodiments.

General Overview

Figure 1:
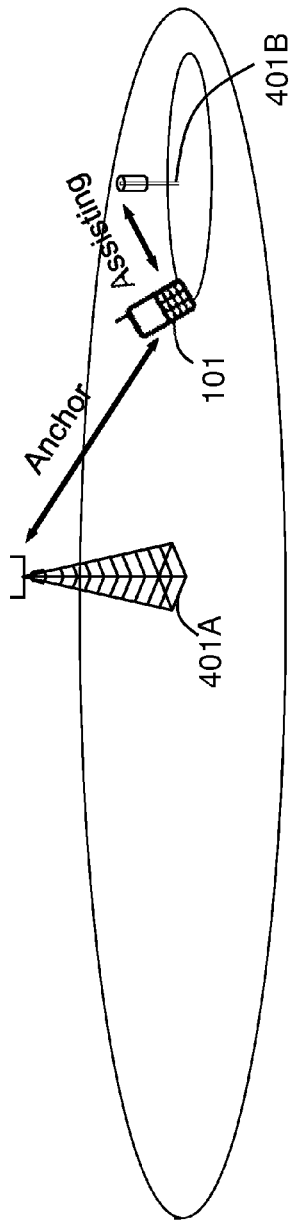
FIG. 1 is an illustrative example of a heterogeneous deployment with simultaneous anchor and assisting flows to a wireless terminal.
Figure 2:
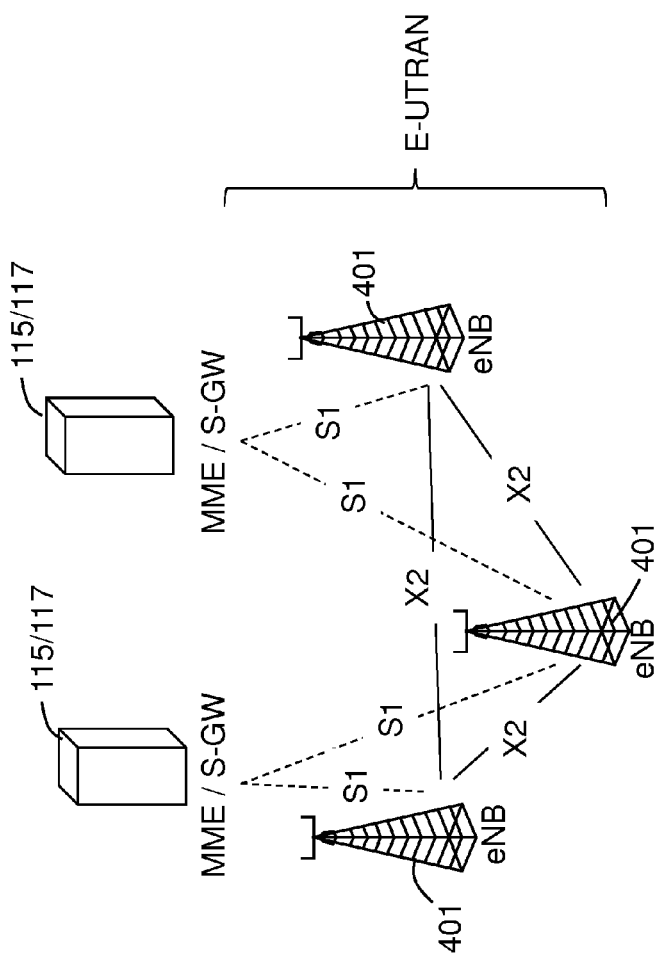
FIG. 2 is an illustrative example of E-UTRAN architecture.

In order to better explain the example embodiments presented herein, a problem will first be identified and discussed. The Evolved UMTS Terrestrial Radio Access Network (E-UTRAN) comprise base stations 401 called enhanced NodeBs (eNBs or eNodeBs), providing the E-UTRA user plane and control plane protocol terminations towards the user equipment. The base stations or eNBs 401 are interconnected with each other by means of the X2 interface. The eNBs 401 are also connected by means of the S1 interface to the EPC (Evolved Packet Core), more specifically to the MME (Mobility Management Entity) 115 by means of the S1-MME interface and to the Serving Gateway (SGW) 117 by means of the S1-U interface. The S1 interface supports many-to-many relation between MMEs/SGWs and eNBs. The E-UTRAN architecture is illustrated in FIG. 2.

The eNB 401 hosts functionalities such as Radio Resource Management (RRM), radio bearer control, admission control, header compression of user plane data towards serving gateway, routing of user plane data towards the serving gateway. The MME 115 is the control node that processes the signaling between the user equipment and the CN. The main functions of the MME 115 are related to connection management and bearer management, which are handled via Non Access Stratum (NAS) protocols. The SGW 117 is the anchor point for user equipment mobility, and also comprises other functionalities such as temporary DL data buffering while the user equipment 101 is being paged, packet routing and forwarding the right eNB, gathering of information for charging and lawful interception. The PDN Gateway (PGW) 119 is the node responsible for user equipment IP address allocation, as well as Quality of Service (QoS) enforcement (this is explained further in later sections).

Figure 3:
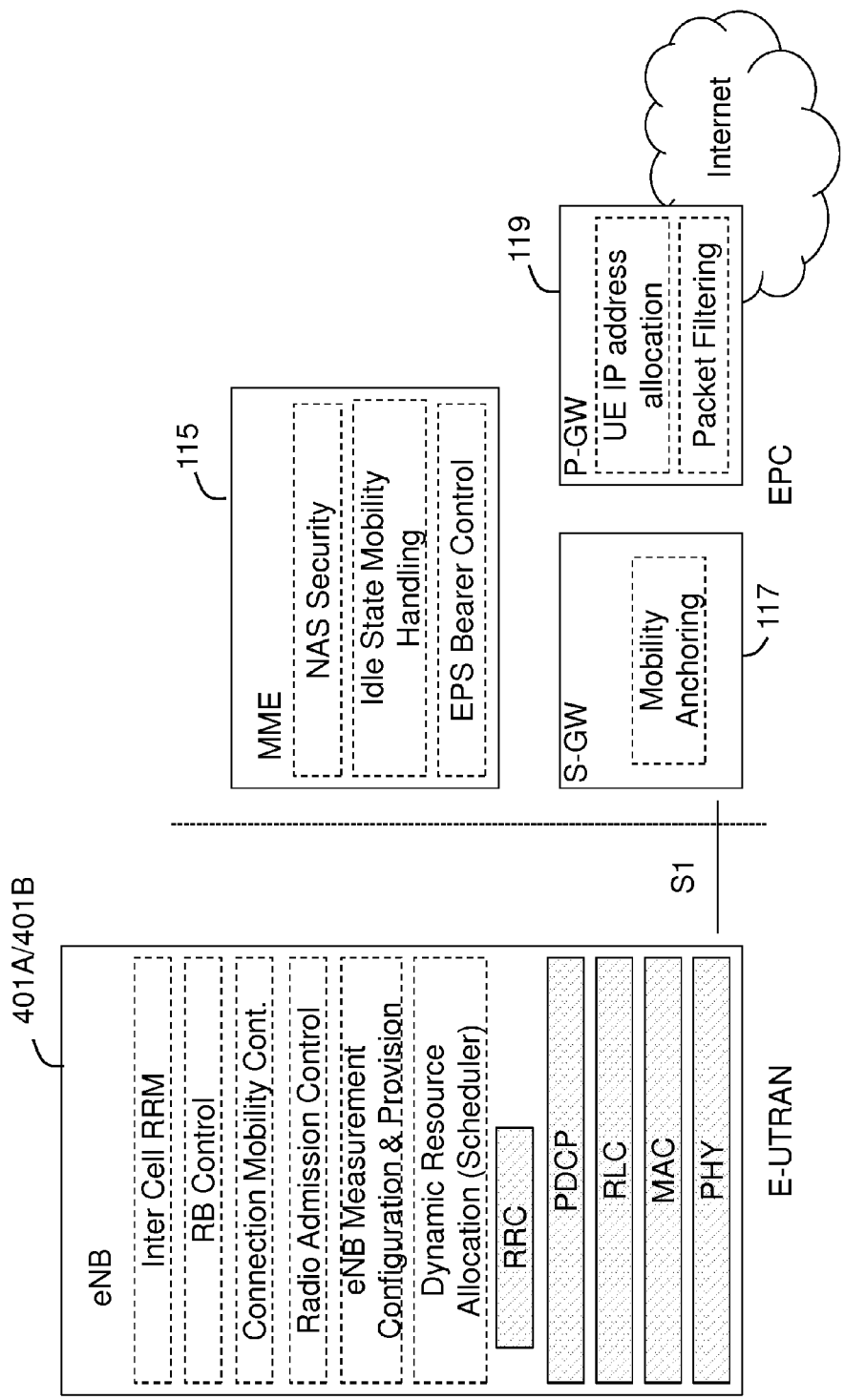
FIG. 3 is a schematic depicting the functional split between E-UTRAN and EPC.

FIG. 3 gives a summary of the functionalities of the different nodes, referred to in 3GPP TS 36.300 and the references therein providing the details of the functionalities of the different nodes. In FIG. 3, the solid lined boxes depict the logical nodes, dashed boxes depict the functional entities of the control plane and cross-hatched boxes depict the radio protocol layers.

Radio Protocol Architecture

Figure 4:
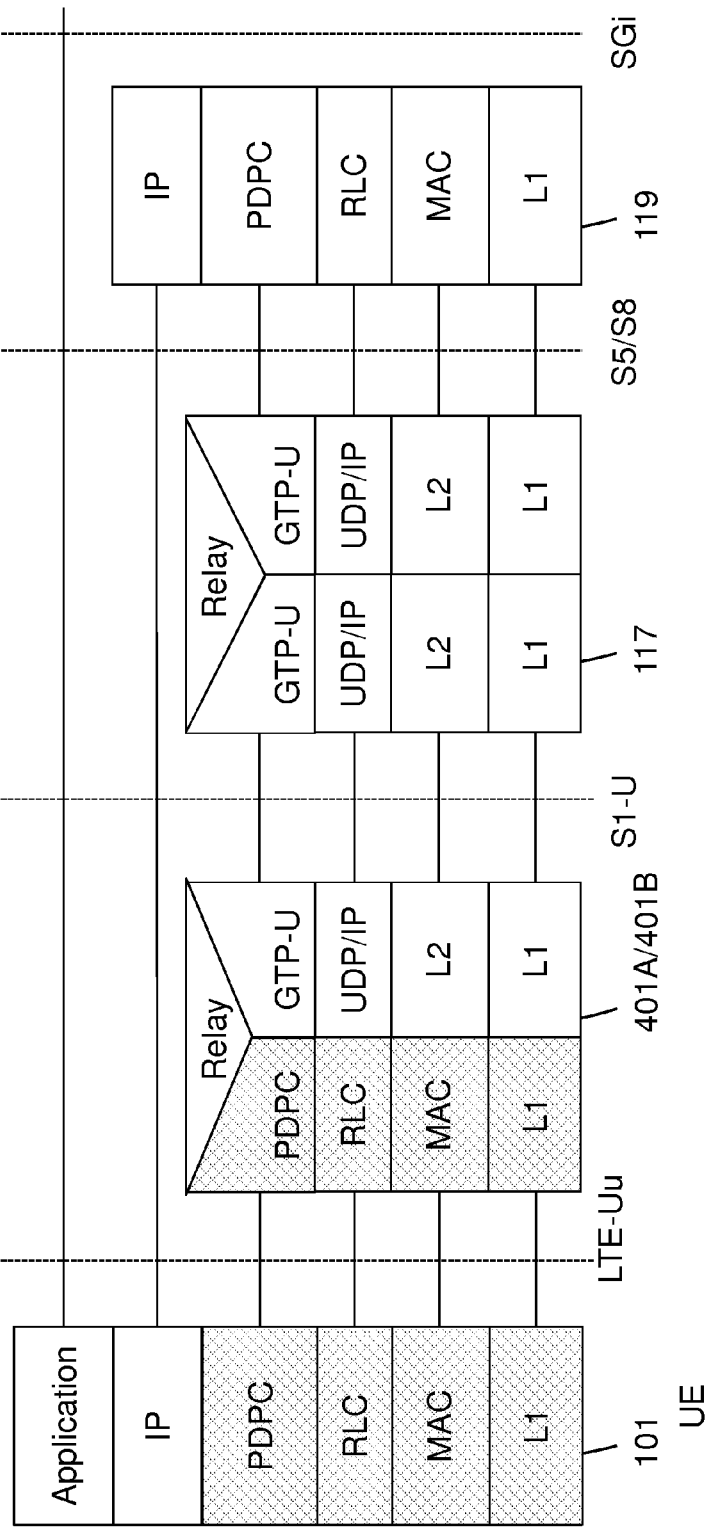
FIG. 4 is a user plane protocol stack.

The radio protocol architecture of E-UTRAN is divided into the user plane and the control plane. FIG. 4 shows the protocol stack for the user-plane. The user plane protocol stack is comprised of the Packet Data Convergence Protocol (PDCP), Radio Link Control (RLC), and Medium Access Control (MAC), which are terminated at the eNB 401. The PDCP manages IP packets in the user plane and it performs functionalities such as header compression, security, and re-ordering and retransmission during handover. The RLC layer is mainly responsible for segmentation (and corresponding assembly) of PDCP packets, in order that they fit the size that is actually to be transmitted over the air interface. RLC can operate either in unacknowledged mode or acknowledged mode, where the latter supports retransmissions. The MAC layer performs multiplexing of data from different radio bearers, and it is the one that informs the RLC about the size of the packets to provide, which is decided based on the required QoS of each radio bearer and the current capacity available to the user equipment 101.

Figure 5:
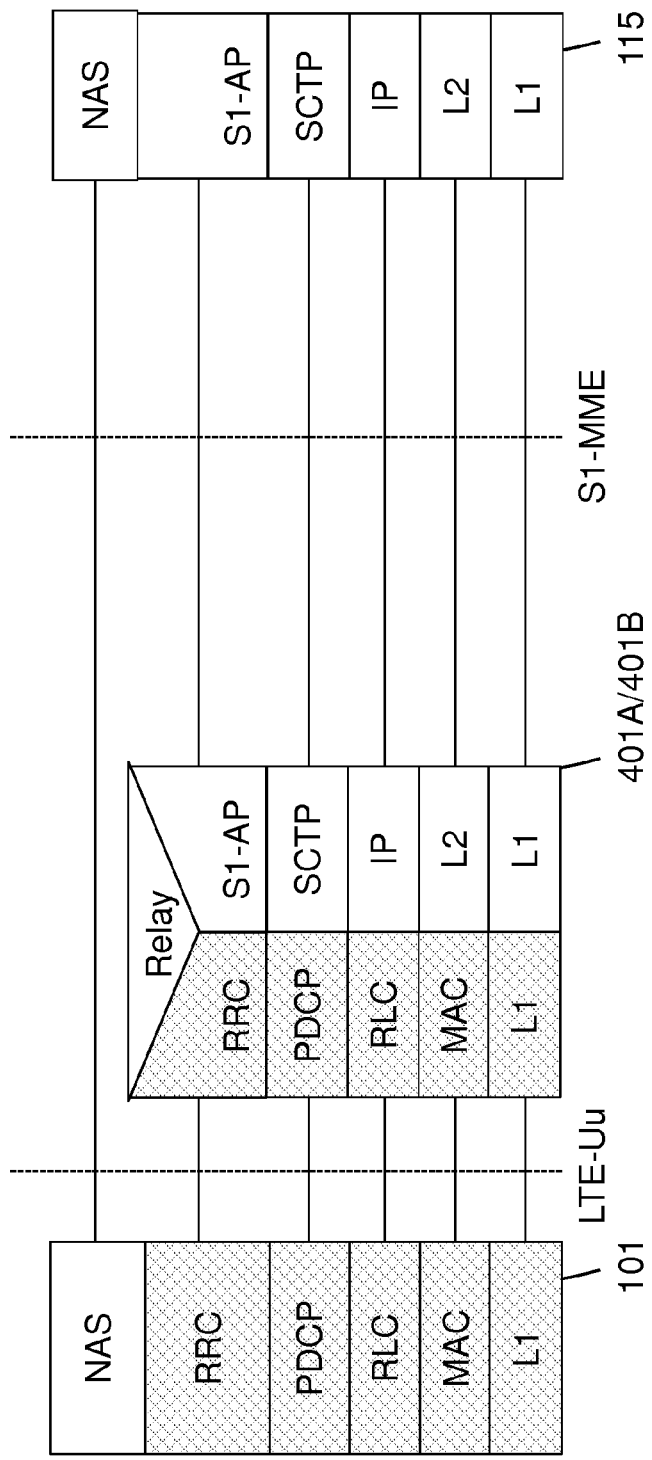
FIG. 5 is a control plane protocol stack.

FIG. 5 shows the control plane protocol stack. The layers below the Radio Resource Control (RRC) layer perform the same functionality as in the user plane except that there is no header compression in the control plane. The main functions of the RRC are the broadcasting of system information, RRC connection control (establishment, modification, and release of RRC connection, establishment of signaling radio bearers (SRB) and data radio bearers (DRBs), handover, configuration of lower protocol layers, radio link failure recovery, etc.), and measurement configuration and reporting. The details of the RRC protocol functionalities and procedures may be found in 3GPP TS 36.331.

A user equipment or wireless terminal 101 in general is uniquely identified over the S1 interface within an eNB 401 with the eNB UE S1AP ID. When an MME 115 receives an eNB UE S1AP ID it stores it for the duration of the user equipment associated logical S1-connection for this user equipment 101. Once known to an MME 115 this IE is comprised in all user equipment associated S1-AP signaling. The eNB UE S1AP ID is unique within the eNB 401, and user equipments are assigned new S1AP ID after a handover by the target eNB.

From the MME side, a user equipment 101 is uniquely identified using the MME UE S1AP ID. When an eNB 401 receives an MME UE S1AP ID it stores it for the duration of the user equipment-associated logical S1 connection for this user equipment 101. Once known to an eNB 401 this IE is comprised in all user equipment associated 51-AP signaling. The MME UE S1AP ID is unique within the MME 115, and it is changed if the user equipment's MME changes, for example, handover between two eNBs connected to different MMEs.

Figure 6:
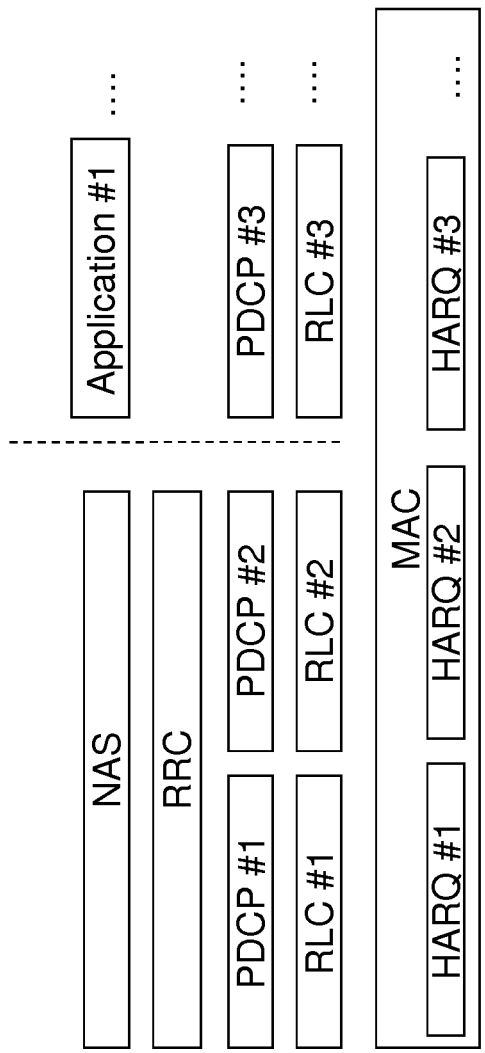
FIG. 6 is a user plane and control plane data flow.

The flow of user plane and control plane data is illustrated in FIG. 6. There is only one MAC entity per user equipment 101 (unless the user equipment supports multiple carriers as in the case of carrier aggregation) and under this MAC entity, several Hybrid ARQ (HARQ) processes might be running simultaneously for rapid retransmissions. There is a separate RLC entity for each radio bearer and if the radio bearer is configured to use PDCP, there is also one separate PDCP entity for that bearer. A bearer is configured to use PDCP only if it is dedicated to a user equipment (i.e., multicast and broadcast data do not utilize PDCP both in the control and user plane and the PDCP is used only for dedicated control message in the control plane and for dedicated UL/DL data in the user plane).

At the transmitting side each layer receives a Service Data Unit (SDU) from a higher layer, and sends a Protocol Data Unit (PDU) to the lower layer. For example, PDCP PDUs are sent towards the RLC, and they are RLC SDUs from RLC point of view, which in turn sends RLC PDUs towards the MAC, which are MAC SDUs from the MAC point of view. At the receiving end, the process is reversed, i.e. each layer passing SDUs to the layer above it, where they are perceived as PDUs.

Quality of Service

A user equipment 101 may have multiple applications running at the same time, each having different QoS requirements, for example, VoIP, browsing, file download, etc. In order to support these different requirements, different bearers are set up, each being associated with a QoS. An EPS bearer/E-RAB (Radio Access Bearer) is the level of granularity for bearer level QoS control in the EPC/E-UTRAN. That is, Service Data Flows (SDF) mapped to the same EPS bearer receive the same bearer level packet forwarding treatment (e.g., scheduling policy, queue management policy, rate shaping policy, RLC configuration, etc.).

One EPS bearer/E-RAB is established when the user equipment 101 connects to a PDN, and that remains established throughout the lifetime of the PDN connection to provide the user equipment 101 with always-on IP connectivity to that PDN. That bearer is referred to as the default bearer. Any additional EPS bearer/E-RAB that is established to the same PDN is referred to as a dedicated bearer. The initial bearer level QoS parameter values of the default bearer are assigned by the network, based on subscription data. The decision to establish or modify a dedicated bearer may only be taken by the EPC, and the bearer level QoS parameter values are always assigned by the EPC.

An EPS bearer/E-RAB is referred to as a GBR bearer if dedicated network resources related to a Guaranteed Bit Rate (GBR) value that is associated with the EPS bearer/E-RAB are permanently allocated (e.g., by an admission control function in the eNB) at bearer establishment/modification. Otherwise, an EPS bearer/E-RAB is referred to as a Non-GBR bearer. A dedicated bearer may either be a GBR or a Non-GBR bearer while a default bearer shall be a Non-GBR bearer.

Figure 7:
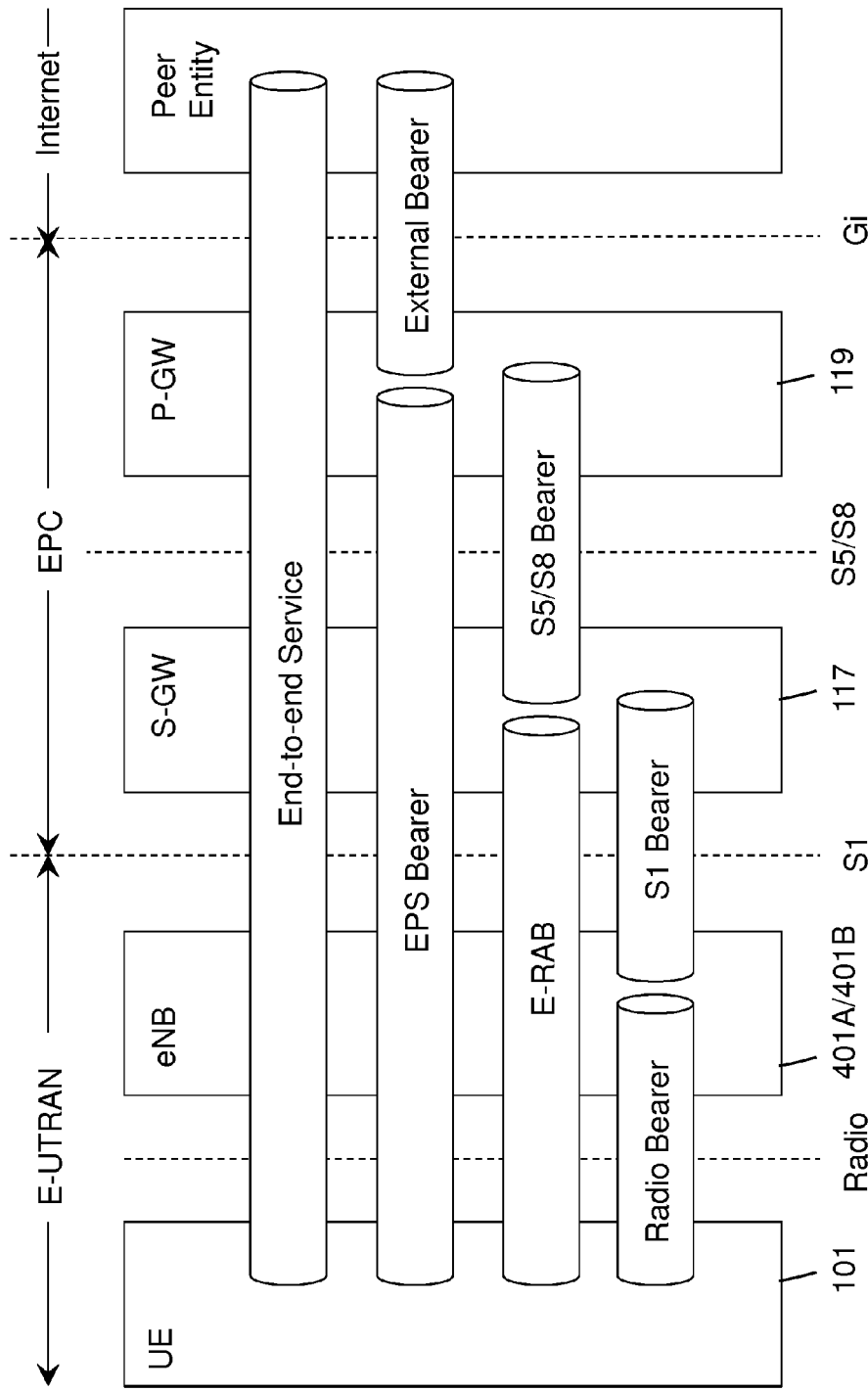
FIG. 7 is an illustrative example of bearer service architecture.

The EPS bearer service architecture is shown in FIG. 7. The packets of an EPS bearer are transported over a radio bearer between the user equipment 101 and eNB 401. An S1 bearer transports the packets of an EPS bearer between the eNB 401 and SGW 117. An E-RAB is actually a concatenation of these two bearers (i.e., radio bearer and S1 bearer), and the two bearers are mapped on a one to one fashion. An S5/S8 bearer transports the packets of the EPS bearer between the SGW 117 and PGW 119, and completes the EPS bearer. Here also there is a one to one mapping between the E-RAB and S5/S8 bearer.

The bearer level (i.e., per bearer or per bearer aggregate) QoS parameters are QCI, ARP, GBR, and AMBR. Each EPS bearer/E-RAB (GBR and Non-GBR) is associated with the following bearer level QoS parameters: QCI and ARP. QoS Class Identifier (QCI) is a scalar that is used as a reference to access node-specific parameters that control bearer level packet forwarding treatment (e.g., scheduling weights, admission thresholds, queue management thresholds, link layer protocol configuration, etc.), and that has been preconfigured by the operator owning the eNodeB 401. The QCI may also be used to reference node-specific parameters that control bearer level packet forwarding treatment in the other nodes in the user plain chain, for example, the PGW 119 and the SGW 117. Nine QCI values are standardized, the detailed requirements of these classes may be found in 3GPP TS 23.203. Allocation and Retention Priority (ARP) is used to decide whether a bearer establishment/modification request may be accepted or needs to be rejected in case of resource limitations. In addition, the ARP may be used by the eNodeB 401, SGW 117 or PGW 119 to decide which bearer(s) to drop during exceptional resource limitations (e.g., at handover).

Each GBR bearer is additionally associated with the bearer level QoS parameters GBR and MBR. Guaranteed Bit Rate (GBR) is the bit rate that may be expected to be provided by a GBR bearer. Maximum Bit Rate (MBR) is the maximum bit rate that may be expected to be provided by a GBR bearer. MBR can be greater or equal to the GBR.

Each APN access, by a user equipment 101, is associated with a per-APN Aggregate Maximum Bit Rate (APN-AMBR). The APN-AMBR sets the limit on the aggregate bit rate that may be expected to be provided across all Non GBR bearers and across all PDN connections of the same APN. Each user equipment 101 in state EMM-REGISTERED is associated with the bearer aggregate level QoS parameter known as per user equipment Aggregate Maximum Bit Rate (UE-AMBR). The UE AMBR limits the aggregate bit rate that may be expected to be provided across all Non GBR bearers of a user equipment 101.

Heterogeneous Networks and Soft/Shared Cells

Figure 8:
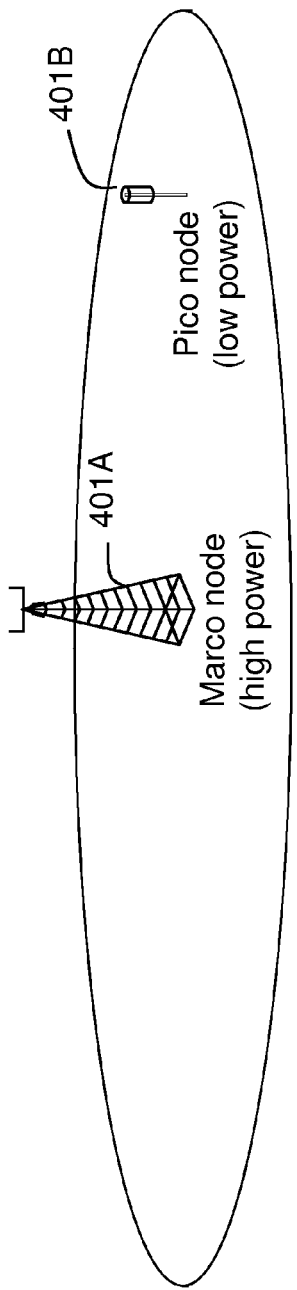
FIG. 8 is an illustrative example of a heterogeneous deployment with a higher-power macro node and a lower-power pico node.

The use of a so called heterogeneous deployment or heterogeneous network, as illustrated in FIG. 8, comprising network transmission nodes with different transmit power operating and with overlapping coverage areas, is considered to be an interesting deployment strategy for cellular networks. In such a deployment, the low-power nodes ("pico nodes"), which may be utilized as assisting base stations 401B, are typically assumed to offer high data rates (Mbit/s), as well as provide high capacity (users/m2 or Mbit/s/m2), in the local areas where this is needed/desired, while the high-power nodes ("macro nodes"), which may be utilized as anchor base stations 401A, are assumed to provide full-area coverage. In practice, the macro nodes 401A may correspond to currently deployed macro cells while the pico nodes 401B are later deployed nodes, extending the capacity and/or achievable data rates within the macro-cell coverage area where needed.

Figure 9:
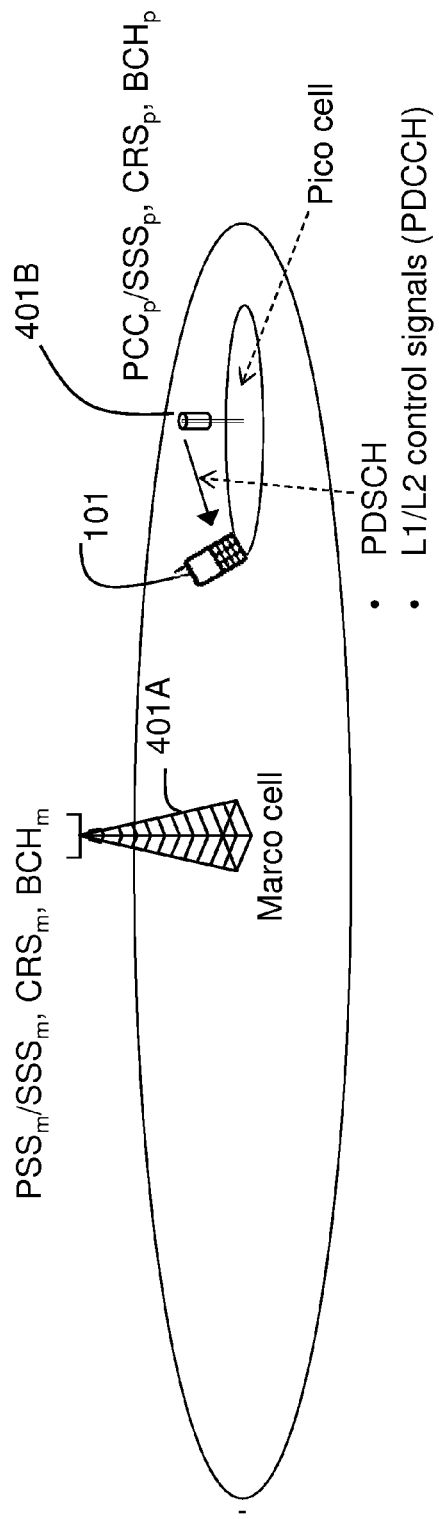
FIG. 9 is an illustrative example of a heterogeneous deployment where the pico node corresponds to a cell of its own.

A pico node 401B of a heterogeneous deployment may correspond to a cell of its own (a "pico cell"), as illustrated in FIG. 9. This means that, in addition to downlink and uplink data transmission/reception, the pico node also transmits the full set of common signals/channels associated with a cell. In the LTE context this comprises Primary and Secondary Synchronization Signals (PSS and SSS) corresponding to the Physical Cell Identity of the pico cell. Also comprised are Cell-specific reference signals (CRS), also corresponding to the Physical Cell Identity of the cell. The CRS may, for example, be used for downlink channel estimation to enable coherent demodulation of downlink transmissions. Further comprised is the Broadcast channel (BCH), with corresponding pico-cell system information.

As the pico node 401B transmits the common signals/ channels, the corresponding pico cell may be detected and selected (e.g., connected to) by a terminal (UE, user equipment) 101. If the pico node 401B corresponds to a cell of its own, also so-called L1/L2 control signaling on the PDCCH (as well as PCFICH and PHICH) are transmitted from the pico node to connected terminals, in addition to downlink data transmission on the PDSCH. The L1/L2 control signaling, for example, provides downlink and uplink scheduling information and Hybrid-ARQ-related information to terminals within the cell. This is shown in FIG. 9.

Figure 10:
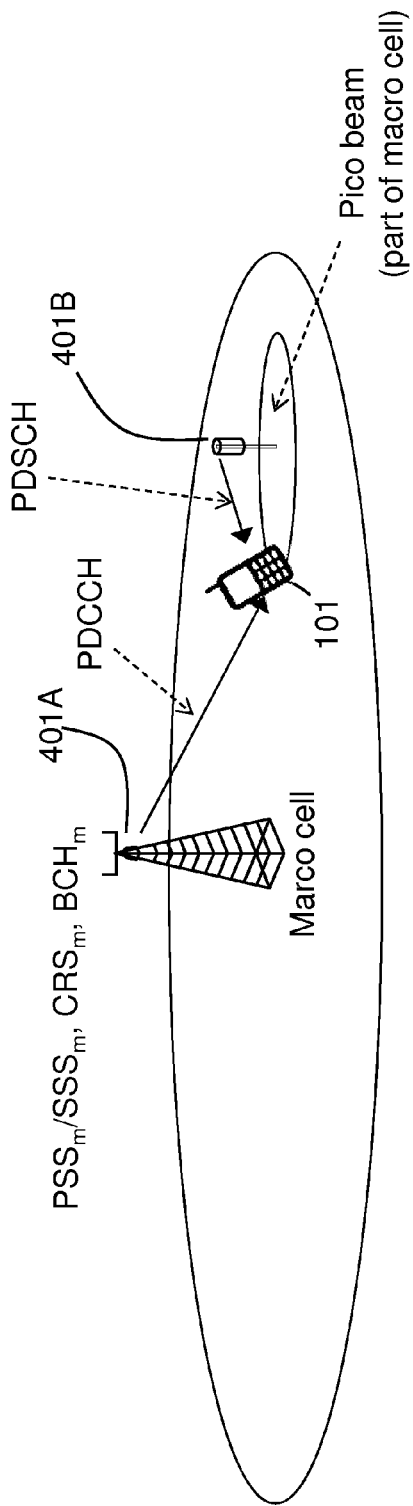
FIG. 10 is an illustrative example of a heterogeneous deployment where the pico node does not correspond to a cell of its own.

Alternatively, a pico node 401B within a heterogeneous deployment may not correspond to a cell of its own but may just provide a data-rate and capacity "extension" of the overlaid macro cell 401A. This is sometimes known as "shared cell" or "soft cell". In this case at least the CRS, PBCH, PSS and SSS are transmitted from the macro node 401A. The PDSCH may be transmitted from the pico node 401B. To allow for demodulation and detection of the PDSCH, despite the fact that no CRS is transmitted from the pico node 401B, DM-RS should be transmitted from the pico node 401B together with the PDSCH. The user equipment-specific reference signals may then be used by the terminal for PDSCH demodulation/detection. This is shown in FIG. 10.

Figure 11:
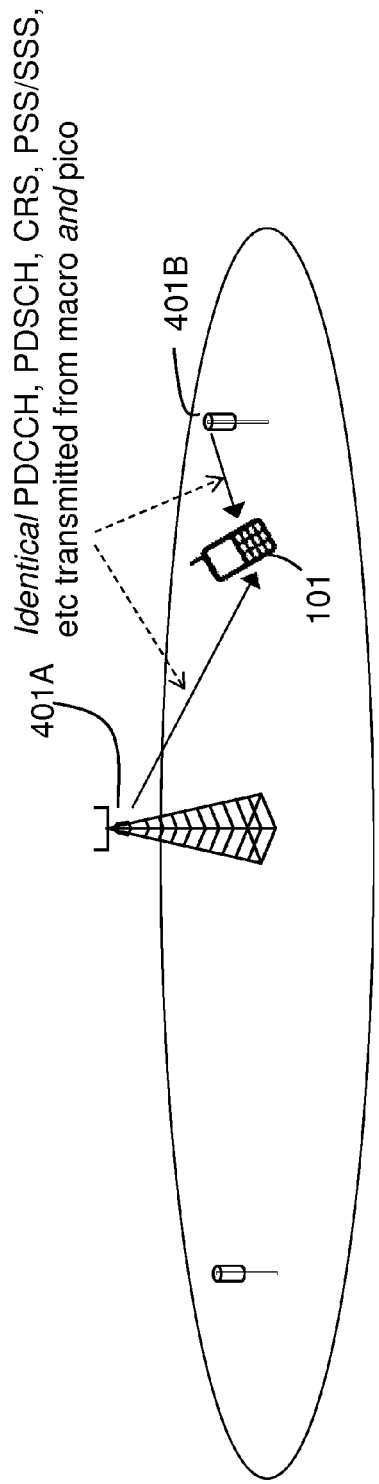
FIG. 11 is a depiction of SFN operation with identical transmission from macro and pico to a terminal.

Transmitting data from a pico node 401B not transmitting CRS as described above requires DM-RS support in the terminal ("non-legacy terminal"). In LTE, DM-RS-based PDSCH reception is supported in Rel-10 and for FDD while for the L1/L2 control signaling, DM-RS-based reception is planned for Rel-11. For terminals not supporting DM-RS-based reception ("legacy terminals") one possibility in a shared cell setting is to exploit $SFN^2$-type of transmission. In essence identical copies of the signals and channels necessary for a legacy terminal are transmitted simultaneously from the macro 401A and pico 401B nodes. From a terminal perspective this will look as a single transmission. Such an operation, which is illustrated in FIG. 11, will only provide an SINR gain. This may be translated into a higher data rate, but not a capacity improvement, as transmission resources cannot be reused across sites within the same cell.

Figure 12:
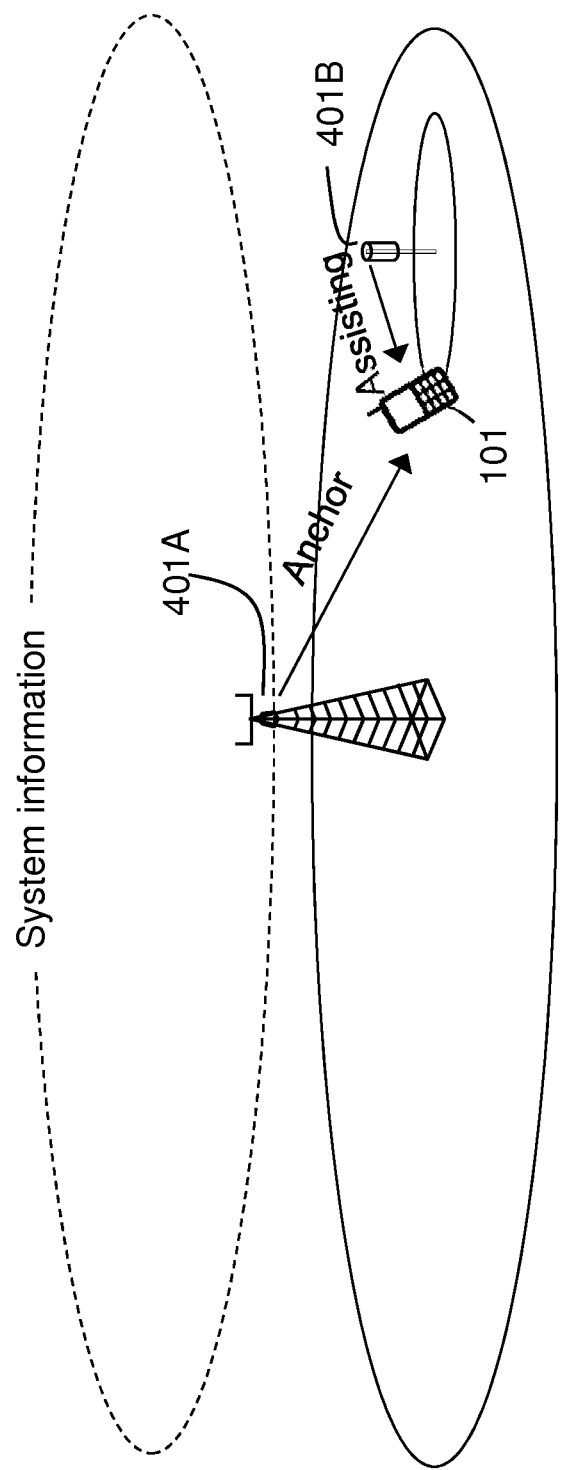
FIG. 12 is a depiction of soft cell operation with the wireless terminal having multiple connections with both the anchor and assisting base stations.

It may be assumed that the macros 401A are able to provide coverage and the picos 401B are there only for capacity enhancements (i.e., no coverage holes), another alternative architecture is where the user equipment maintains the macro connectivity all the time (called the "anchor" flow), and adds the pico connectivity when it is in the coverage area of the pico (called the "assisting" flow). When both connections are active, the anchor flow may be used either for control signaling while the assisting flow is used for data. However, it will still be possible to send data also via the anchor flow. We define this case as "multiple connectivity" or "dual connectivity". This is illustrated in FIG. 12. Note that in this case, as in the previous cases, the system information is shown to be sent only from the macro 401A, but it is still possible to send it also from the picos 401B.

Protocol Architecture for Soft Cells

Figure 13:
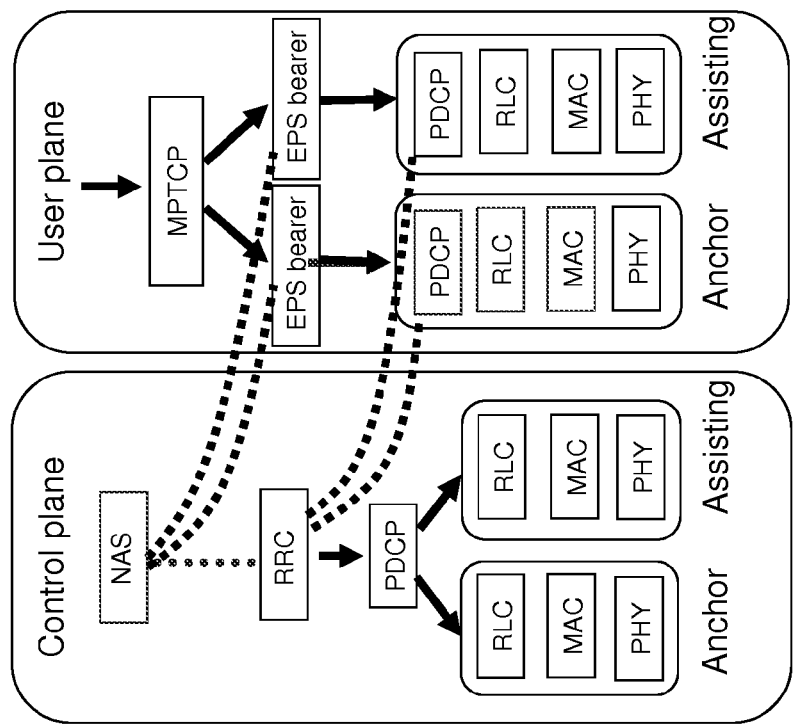
FIG. 13 is an illustrative example of protocol architecture for multiple or dual connectivity.

In order to support multiple connectivity, several architectural options are possible both for the control and user plane. For the user plane, we can have a centralized approach where the PDCP (or even the RLC) is terminated at the anchor only and the assisting node terminates at the RLC (or even the MAC) level. A decentralized approach will be to have the assisting node to terminate at the PDCP level. A similar approach may be taken in the control plane, for example, distributed or centralized PDCP/RLC, but on top of that we have the additional dimension of centralizing or distributing the RRC. FIG. 13 shows example control and user plane architectures, where the user plane is employing distributed PDCP, while the control plane is centralized at the PDCP level at the anchor. Note that in the figure, user plane aggregation, for example, the possibility to split the packets belonging to one application data flow over the anchor and assisting links, may be realized by using a higher layer aggregation protocol like multi-path TCP (MTCP).

User Equipment Measurements

User equipments may be configured to report measurements, mainly for the sake of supporting mobility. As specified in 3GPP TS 36.331, the E-UTRAN provides the measurement configuration applicable for a user equipment in RRC_CONNECTED by means of dedicated signaling, for example, using the RRCConnectionReconfiguration message.

Various measurement configurations may be signaled to the user equipment. An example of such a measurement configuration is measurement objects. Measurement objects define on what the user equipment should perform the measurements on, for example, a carrier frequency. The measurement object may also comprise a list of cells to be considered (white-list or black-list) as well as associated parameters, for example, frequency- or cell-specific offsets.

Another example of a measurement configuration is a reporting configuration. Reporting configurations comprise periodic or event-triggered criteria which cause the user equipment to send a measurement report, as well as the details of what information the user equipment is expected to report. The information to be reported may comprise quantities such as, for example, Received Signal Code Power (RSCP) for UMTS or Reference Signal Received Power (RSRP) for LTE, and the number of cells.

Another example configuration may be measurement identities. Measurement identities identify a measurement and define the applicable measurement object and reporting configuration. Each measurement identity links one measurement object with one reporting configuration. By configuring multiple measurement identities it is possible to link more than one measurement object to the same reporting configuration, as well as to link more than one reporting configuration to the same measurement object. The measurement identity is used as a reference number in the measurement report.

A further configuration example is quantity configurations. Quantity configurations define the filtering to be used on each measurement. One quantity configuration is configured per RAT type, and one filter can be configured per measurement quantity.

Yet another example configuration is measurement gaps. Measurement gaps define time periods when no uplink or downlink transmissions will be scheduled, so that the user equipment may perform the measurements, for example, inter-frequency measurements where the user equipment has only one Tx/Rx unit and supports only one frequency at a time. The measurement gaps configuration are common for all gap-assisted measurements.

The E-UTRAN configures only a single measurement object for a given frequency, but more than one measurement identity may use the same measurement object. The identifiers used for the measurement object and reporting configuration are unique across all measurement types. It is possible to configure the quantity which triggers the report (RSCP or RSRP) for each reporting configuration.

In LTE, some examples of measurement metrics used are the Reference Signal Received Power (RSRP) and Reference Signal Received Quality (RSRQ). RSRP is a cell specific measure of signal strength and it is mainly used for ranking different cells for handover and cell reselection purposes, and it is calculated as the linear average of the power of the Resource Elements (REs) which carry cell-specific Reference Signals (RSs). The RSRQ, on the other hand, also takes the interference into consideration by taking the total received wideband power into account as well.

One of the measurement configuration parameters that user equipments receive from their serving eNBs is the S-measure. The S-measure tells the user equipment when to start measuring neighboring cells. If the measured RSRP of the serving cell falls below the S-measure, indicating the signal of the serving cell is not that strong anymore, the user equipment starts measuring the signal strength of RSs from the neighboring cells. The S-measure is an optional parameter and different S-measure values may be specified for initiating intra-frequency, inter-frequency and inter-RAT measurements. Once the user equipment is enabled for measuring, it may report the serving cell, listed cells (i.e. cells indicated as part of the measurement object), and/or detected cells on a listed frequency (i.e. cells which are not listed cells but are detected by the user equipment).

There are several measurement configuration parameters that specify the triggering of measurement reports from the user equipment. An example of event-triggered criteria, which is specified for intra-RAT measurement reporting in LTE, is Event A1. Event A1 triggers when the Primary serving cell, PCell becomes better than an absolute threshold. Another example is Event A2, which triggers when the PCell becomes worse than the absolute threshold. A further example is Event A3, which triggers when the neighbor cell becomes better than an offset relative to the PCell. A further example is Event A4, which triggers when the neighbor cell becomes better than the absolute threshold. Yet another example is Event A5, which triggers when the PCell becomes worse than one absolute threshold and the neighbor cell becomes better than another absolute threshold. Another example is Event A6, which triggers when the neighbor cell becomes better than an offset relative to a secondary cell (SCell).

Various event-triggered reporting criteria are specified for inter-RAT mobility. An example is Event B1, which triggers when the neighbor cell becomes better than an absolute threshold. A further example is Event B2, which triggers when the serving cell becomes worse than one absolute threshold and a neighbor cell becomes better than another absolute threshold.

Figure 14:
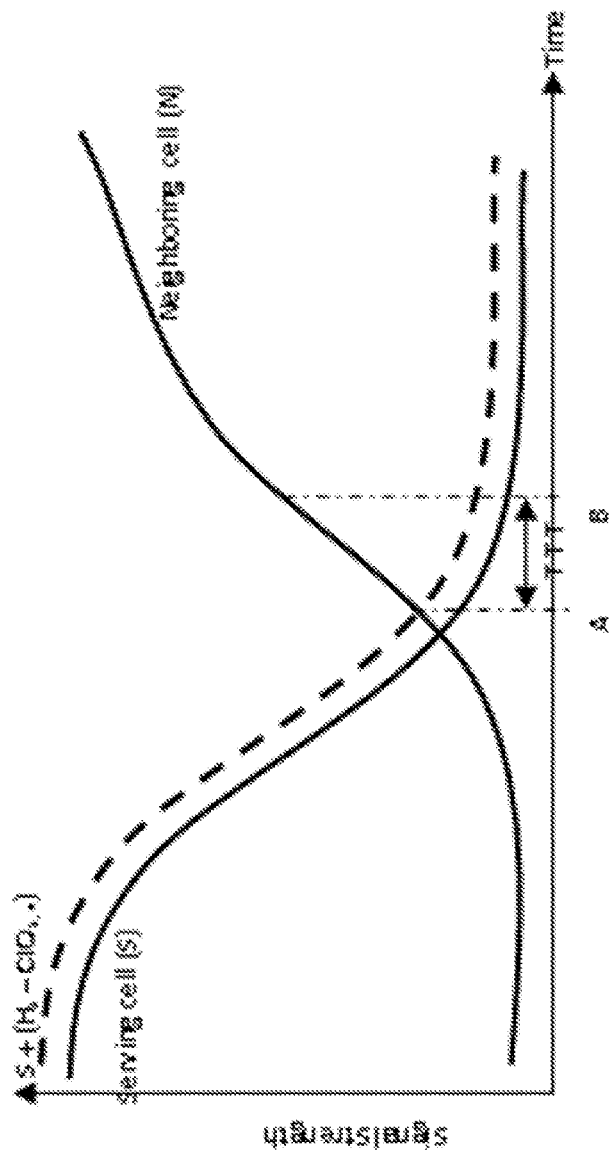
FIG. 14 is an illustrative example of handover triggering.

An example of a measurement report triggering event related to handover is A3, and its usage is illustrated in FIG. 14. The triggering conditions for event A3 can be formulated as:

$$N > S + \text{HOM} \quad (1)$$

where N and S are the signal strengths of the neighbor and serving cells, respectively, and HOM is the handover margin. HOM is the difference between the radio quality of the serving cell and the radio quality needed before attempting a handover. The radio quality is measured either using RSRP or RSRQ (see 3GPP TS 36.133 for further explanation).

The user equipment triggers the intra-frequency handover procedure by sending Event A3 report to the eNB. This event occurs when the user equipment measures that the target cell is better than the serving cell with a margin "HOM". The user equipment is configured over RRC when entering a cell and the HOM is calculated from the following configurable parameters:

$$\text{HOM} = \text{Ofs} + \text{Ocs} + \text{Off} - \text{Ofn} - \text{Ocn} + \text{Hys} \quad (2)$$

where Ofs is the frequency specific offset of the serving cell, Ocs is the cell specific offset (CIO) of the serving cell, Off is the a3-Offset, Ofn is the frequency specific offset of the neighbor cell, Ocn is the CIO of the neighbor cell and Hys is the hysteresis.

If the condition in (1) is satisfied and it remains valid for a certain duration known as Time To Trigger (TTT), the user equipment sends a measurement report to the serving eNB (in FIG. 14, event A3 is satisfied at point A and measurement report is sent at point B in time). When the serving eNB gets the measurement report, it may initiate a handover towards the neighbor.

In addition to event-triggered reporting, the user equipment may be configured to perform periodic measurement reporting. In this case, the same parameters may be configured as for event-triggered reporting, except that the user equipment starts reporting immediately rather than only after the occurrence of an event.

Handover

Handover is one of the important aspects of any mobile communication system, where the system provides service continuity of the user equipment by transferring the connection from one cell to another depending on several factors such as signal strength, load conditions, service requirements, etc. The provision of efficient/effective handovers (minimum number of unnecessary handovers, minimum number of handover failures, minimum handover delay, etc.), would affect not only the Quality of Service (QoS) of the end user but also the overall mobile network capacity and performance.

In LTE, UE-assisted, network controlled handover is utilized (3GPP TS 36.300). The handover is based on user equipment reports, and the user equipment 101 is moved, if required and possible, to the most appropriate cell that will assure service continuity and quality.

Figure 15:
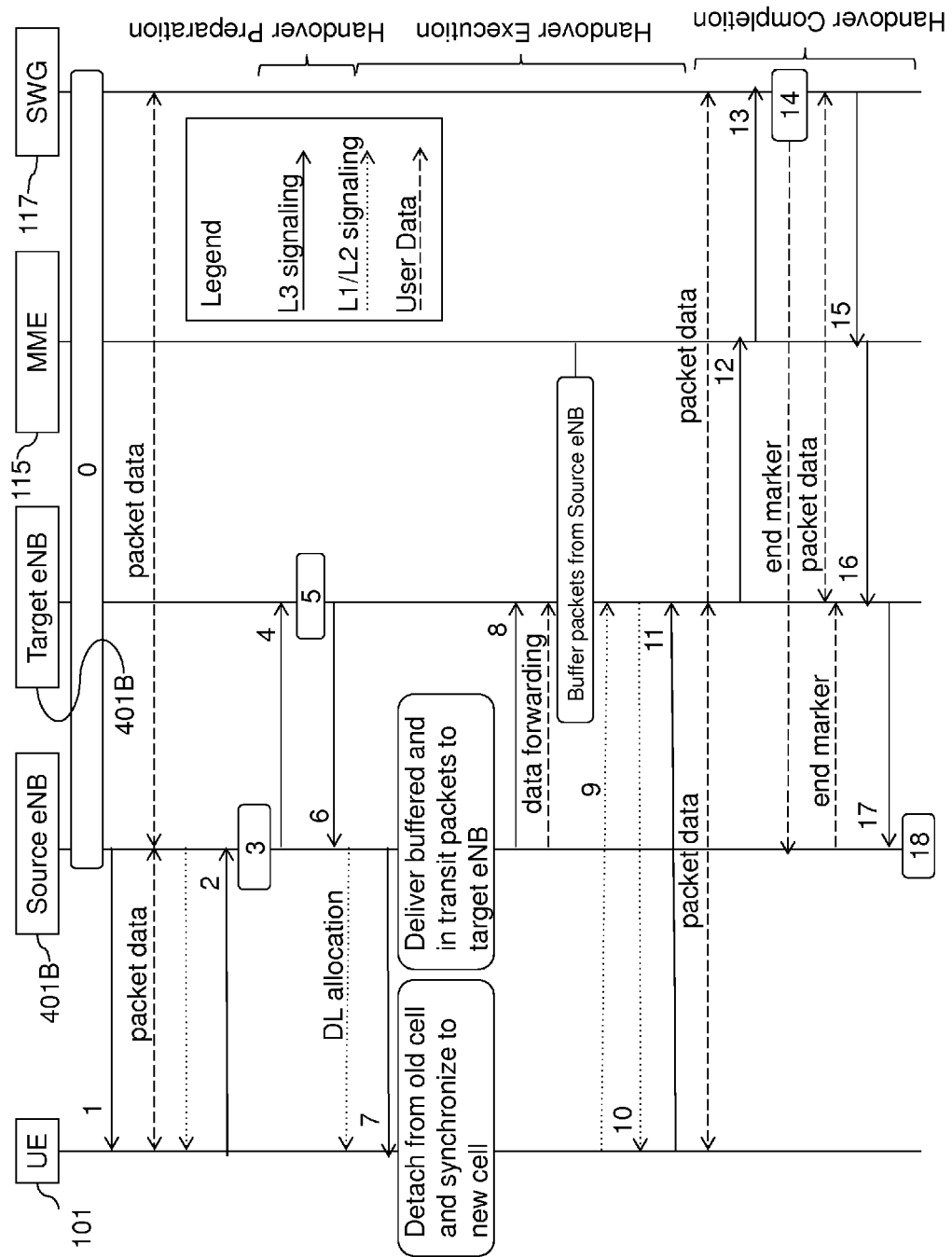
FIG. 15 is a messaging diagram illustrating an example of an X2 handover in LTE.

Handover is performed via the X2 connection, whenever available, and if not, using S1 (i.e., involving the Core Network (CN)). The X2 Handover process is shown in FIG. 15. The handover procedure can be sub-divided into three stages of preparation (initiation), execution and completion.

During the preparation stage, based on the measurement results the source eNB is getting from the user equipment, the source eNB decides whether to handover the connection to another eNB or not. If the decision is to handover, the source eNB sends a HANDOVER REQUEST message to the target eNB. The source eNB must indicate the cause of the HO in this message. Example causes for HO may be for radio reasons, resource optimisation, and/or to reduce the load in the serving cell.

Thus the target eNB knows that the HO is due to resource optimization or to reduce the load in the serving cell. If the target eNB is able to admit the user equipment, a message is sent to the user equipment to initiate the handover, and we enter the handover execution state. DL data arriving at the source eNB for the user equipment are then forwarded to the new target eNB.

The handover completion stage is entered once the target eNB and the user equipment are synchronized and a handover confirm message (step 11 of FIG. 15) is received by the target eNB. After a proper setup of the connection with the target eNB is performed (which comprises the switching of the DL path in the serving gateway), the old connection is released and any remaining data in the source eNB that is destined for the user equipment is forwarded to the target eNB. Then normal packet flow may ensue through the target eNB.

Overview of the Example Embodiments

LTE currently supports only one to one connections between user equipments and eNBs. As such, when a handover is initiated, the target is asked to admit all the bearers of the user equipment. If for some reason, such as overload situation, that some of the bearers may not be admitted at the target, the source may either cancel the handover (and possibly try another candidate target) or accept it and handover the user equipment to the target, which will result in the dropping of the non-admitted bearers. This may have severe consequences on the overall experience of the user. Furthermore, the handover procedures specified in 3GPP are aimed at keeping the user equipment connected to only one cell. Namely, when a handover procedure is completed, the user equipment moves all or part of its data and signaling bearers to the target, leaving no further communication with the source.

With the advent of soft cells, new handover mechanisms (triggering, preparation, execution) that may take advantage of the possibility to connect a user equipment to multiple eNBs at the same time are required. In fact, current specifications do not allow to setup bearers in parallel and in multiple eNBs for the same user equipment. This would allow an optimal distribution of bearers depending on their QoS and UL/DL requirements. According to some of the example embodiments, the procedural aspects of mobility, bearer establishment and maintenance with soft cells is addressed.

According to some of the example embodiments, the procedures used to setup, modify and tear down bearers between anchor and assisting nodes are described. Also, procedures aimed at enabling selective handover decisions are defined.

In general, the terms anchor node and assisting node, or anchor cell and assisting cell are used to identify a serving cell (anchor cell) hosted by a serving node (anchor node) and a neighbour cell (assisting cell) hosted by a neighbour node (assisting node), where bearers for the same user equipment are moved, setup, modified or removed in both cells at the same time and where the main control plane connection for the served user equipment is either kept at the anchor node or it is relayed by the anchor node.

According to some of the example embodiments, two main alternatives may be highlighted. First, an alternative may be to exploit the presence of the existing X2 interface between anchor and assisting node and to enhance existing X2 procedures or introduce new procedures. Second, an alternative may be to introduce a new interface, for example called X3, between the anchor node and the assisting node, mainly used, but not limited to, procedures associated with mobility and bearer management between anchor nodes and assisting nodes.

According to some of the example embodiments, a focus on enhancing the handover procedures, used either on X2 interface or used on a new X3 interface, to introduce new information allowing the target node to understand that the procedure in place is for a selective handover and to allow appropriate handling of bearers mobility in such a scenario is provided.

According to some of the example embodiments, a focus on defining new procedures for the management and tearing down of bearers in the assisting cell is also provided. This is achieved by reusing procedures similar to the bearer management procedures available over the S1 interface, as defined in 3GPP TS 36.413.

According to some of the example embodiments, procedures to notify handover execution completion and to notify via handover preparation procedures whether the handover is selective or not are provided.

According to some of the example embodiments, procedures to exchange information about whether a node or a cell within a node supports selective handover and the node may provide information to allow for building a database of neighbour nodes or cells information concerning whether they support selective handovers are introduced.

According to some of the example embodiments, procedures to forward measurement reports from the anchor node to the assisting node, with the objective of allowing the assisting node to take a decision on whether the user equipment shall be handed over to a different assisting node are addressed.

According to some of the example embodiments, an extension of the handover decision making process at the assisting node for mobility of user equipment bearers served by the assisting node is provided. Such procedures define signal specific measurement configurations transmitted from the assisting node to the anchor node.

Further details of the example embodiments are described below according to the corresponding sub-heading. It should be appreciated that the example embodiments are described with the use of an LTE based system as an example, however, the example embodiments may be applied to any communications system. It should also be appreciated that the term wireless terminal and user equipment may be used interchangeably. It should further be appreciated that the term assisting node and assisting base station may also be used interchangeably.

X2 and X3 Interfaces

According to some of the example embodiments, the example embodiments described may be either applied to a new interface adopted for communication between anchor node and assisting node, for instance called X3, or they may be applied to the existing X2 interface connecting two eNBs.

Figure 16:
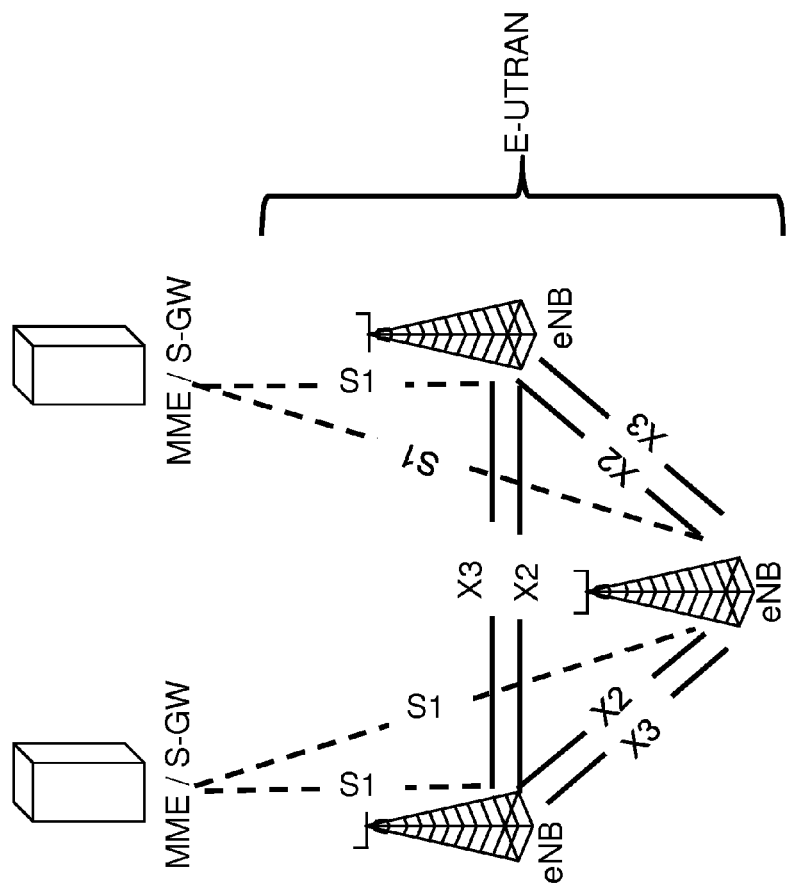
FIG. 16 is an illustrative example of interface options for an anchor and assisting node cell in an E-UTRAN architecture, according to some of the example embodiments.

FIG. 16 describes the potential interfaces between eNBs in a EUTRAN architecture where eNBs can either be anchor nodes or assisting nodes or both. In FIG. 16, neighbouring eNBs could either be connected via an X2 interface enhanced with the procedures described with respect to the example embodiments report or they could be connected via an X2 interface and an X3 interface, where the latter supports the procedures described in the example embodiments report.

According to some of the example embodiments, the procedures used for selective handovers. Namely, the handover procedures involves the handing over of a subset of user equipment bearers to a target cell while some other user equipment bearers are kept active in the source cell, enabling bearer traffic transmission to the same user equipment from at least two different cells.

Handover Messaging

Example embodiments described herein discuss the use of a selective handover. A selective handover may be a handover of a subset of bearers associated with a user equipment. It should be appreciated that the sub-set may be an empty subset (e.g., zero bearers), any number less than the full set of bearers, or the full set of bearers associated with the user equipment. It should be appreciated herein that a selective handover may comprise a variety of different subcases. Examples of such subcases are provided below.

1) As a first use case, an anchor may keep all bearers, both SRBs and DRBs. Thus, the selective handover may be an empty handover where target is just prepared, and the user equipment synchronizes with the target without handing over any radio bearers.

2) A second use case may be that the anchor keeps all SRBs and some DRBs, while the target receives some DRBs associated with the user equipment via the handover procedure.

3) A third use case may be that the anchor keeps all SRBs, while target is handed over all DRBs.

4) As a fourth use case, the role of the anchor node may be switched. As an example, three methods for the switching of anchors are provided below.

a. According to some of the example embodiments, the target becomes the anchor (i.e., all SRBs are handed over to the target), and all DRBs may remain in source (which is the new assisting node). It should be appreciated that this may be viewed as an opposite scenario of use case 3.

b. According to some of the example embodiments, the target may become the anchor (i.e., all of the SRBs are handed over to the target), and the target may also take some DRBs. Meanwhile, some of the DRBs may still remain at the source. It should be appreciated that this may be viewed as an opposite scenario of use case 2.

c. According to some of the example embodiments, the target becomes the anchor (i.e., all of the SRBs are handed over to the target), and the target also takes all of the DRBs. It should be appreciated, in contrast to a full handover, here a relationship with the source is maintained. It should be appreciated that this may be viewed an opposite scenario of use case 1.

5) As a fifth use case, a selective handover may be provided between to assisting nodes. In this example use case the anchor remains the same, and some DRBs are switched between two the two assisting nodes.

6) As a sixth use case, a split of the control plane in the anchor and assisting node may occur. As an example, three methods for the split are provided.

a. According to some of the example embodiments, the source keeps all DRBs and some SRBs. The target gets some SRBs as a result of the handover procedure.

b. According to some of the example embodiments, the source may keep some of the DRBs and some of the SRBs, while the target receives some of the SRBs and some of the DRBs associated with the user equipment as a result of the selective handover.

c. According to some of the example embodiments, the source may keep some of the SRBs, while the target gets all DRBs and some of the SRBs associated with the wireless terminal as a result of the selective handover.

As explained in conjunction to FIG. 13, the protocol architecture assumed for the scenarios considered is based on the assumption of a centralised RRC protocol, where the centralisation node may either be connected or co-located or be the same node as the anchor node. When performing a selective handover and due to the fact that RRC termination is either at the anchor node or through the anchor node, it may be assumed that the RRC Connection Reconfiguration Complete message (message 11 in FIG. 15) is not sent from the user equipment to the target node, but it is sent from the user equipment to the serving anchor node.

Figure 17:
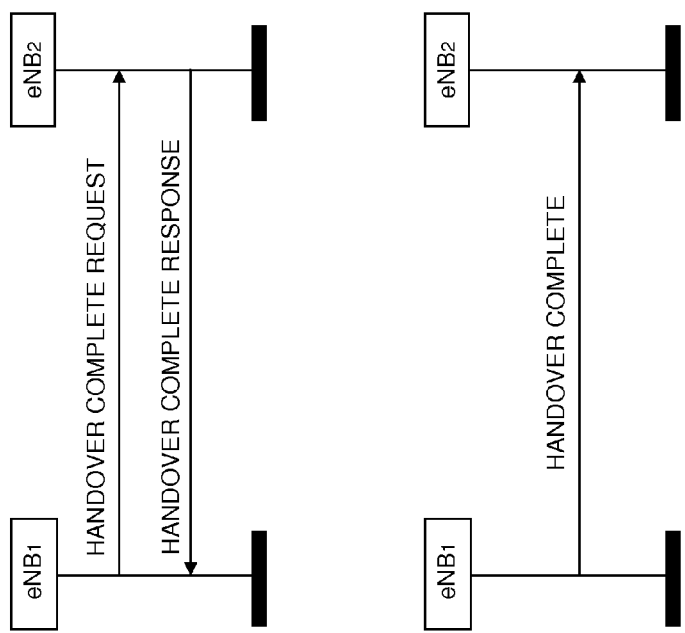
FIG. 17 is a messaging diagram illustrating handover completion procedures, according to some of the example embodiments.

This constitutes a change with respect to current specifications and it means that the target assisting node is not aware of whether the handover execution was completed by the user equipment. To overcome this problem a new handover completion procedure is defined. The handover completion procedure may be either constituted by a single message, for example, named the HANDOVER COMPLETED message sent from source eNB to target eNB, or it may be constituted of two messages: for example, the HANDOVER COMPLETED REQUEST message and HANDOVER COMPLETED RESPONSE message. FIG. 17 shows an example of the procedure according to the two embodiments outlined, where eNB1 is the anchor node and eNB2 is the assisting node.

According to some of the example embodiments, the HANDOVER COMPLETION REQUEST or HANDOVER COMPLETE messages may comprise a Message Type IE (as defined in 3GPP TS36.423) and it may comprise any number of additional IEs. An example of such an IE is any or all of the IEs present in the RRCConnectionReconfigurationComplete message defined in 3GPP TS36.331. Another example of an IE which may be comprised in the handover messages is user equipment specific identifications, for example, IMSI or S-TMSI, for the user equipment being handed over. A further example of an IE which may be comprised in the handover message is a specific identification for the handover preparation procedure which the message corresponds to. A further example of such an IE may be an IE specifying whether the handover was completed successfully or whether it failed to complete.

The HANDOVER COMPLETION REQUEST or HANDOVER COMPLETE message may also serve an additional purpose, namely these messages may indicate to the target eNB that a legacy handover (e.g., a full handover) for which not all bearers were successfully relocated to target has been converted to a selective handover, where the bearers that failed to be setup in the target node may have been kept active at the source node. To enable such indication another IE may be comprised in these messages, for example, a Selective Handover Indication IE and defined as in Table 8.

The HANDOVER COMPLETE RESPONSE message comprises a Message Type IE (as defined in 3GPP TS36.423) and it may comprise an IE indicating that the handover was finalised successfully at target eNB. Additionally, in case of procedures comprising a request and response message, the response from target eNB to source eNB may comprise a HANDOVER COMPLETE FAILURE message. The latter message is used if the handover failed at the target eNB before the handover completion procedures were terminated. The HANDOVER COMPLETE FAILURE message may comprise a Message Type IE and a Cause IE specifying the cause of failure.

According to some of the example embodiments, procedures for handover preparation are described. For such procedures, the X2 Handover Preparation procedures may be taken into account as baseline messages. This embodiment comprises both the option where the X2 Handover Preparation procedures are enhanced with additional IEs or where procedures similar to X2 Handover Preparation are adopted over a new interface between anchor and assisting nodes.

Figure 18:
FIG. 18 is a messaging diagram illustrating handover preparation procedures, according to some of the example embodiments.

A generalized example of these procedure messages is shown in FIG. 18. Note that FIG. 18 is also present in the handover preparation descriptions in 3GPP TS36.423, which specify procedures on the X2 interface. However, according to the example embodiments presented herein, an interface independent means of communication may be provided and therefore the example embodiments may be utilized with any new interface adopted. As an example, the procedures described may be applied to UTRAN networks over Iur interfaces.

By taking the X2: HANDOVER REQUEST message as an example, the proposed enhancements comprise letting the target eNB be informed that a given handover is a selective handover rather than a legacy handover (i.e. full handover after which the user equipment connection is kept in one cell only) by introducing a new optional Information Element (IE) (e.g. "Selective Handover") in the HANDOVER REQUEST message. This IE may take different values depending on the type of selective handover that is being requested. For example, it may have three values, a value of "0" referring to "data radio bearers" (meaning only the data radio bearers listed in the E-RAB list are to be handed over) or value "1" referring to "signalling radio bearers" (meaning only the signalling radio bearers listed in the E-RAB list are to be handed over) or it may have the value "2" referring to "signalling and data radio bearers" (meaning signalling radio bearers as well as the data radio bearers comprised in the E-RAB list are to be handed over). The Selective Handover IE may also be comprised inside the RRC Context IE, which is also comprised in the X2: HANDOVER REQUEST message. If the procedure is implemented using the X2 interface, the existing IEs in the X2: HANDOVER REQUIRED message may be reused and the additional Selective Handover IE may be added.

Table 1 and Table is provide an example of IEs comprised in the HANDOVER REQUEST message, where all IEs apart from the Selective Handover IE are already present in the X2: HANDOVER REQUEST message.

TABLE 1

Example of enhanced HANDOVER REQUEST message

| IE/Group Name | Presence | Range | Semantics description | Criticality | Assigned Criticality |
|---|---|---|---|---|---|
| Message Type | M | | | YES | reject |
| Old eNB UE X2AP ID | M | | Allocated at the source eNB | YES | reject |
| Cause | M | | | YES | ignore |
| Target Cell ID | M | | | YES | reject |
| GUMMEI | M | | | YES | reject |
| UE Context Information | | 1 | | YES | reject |
| >MME UE S1AP ID | M | | MME UE S1AP ID allocated at the MME | — | — |
| >UE Security Capabilities | M | | | — | — |
| >AS Security Information | M | | | — | — |
| >UE Aggregate Maximum Bit Rate | M | | | — | — |
| >Subscriber Profile ID for RAT/Frequency priority | O | | | — | — |
| >E-RABs To Be Setup List | | 1 | | — | — |
| >>E-RABs To Be Setup Item | | 1 . . . <maxnoof Bearers> | | EACH | ignore |
| >>>E-RAB ID | M | | | — | — |

TABLE 1-continued

Example of enhanced HANDOVER REQUEST message

| IE/Group Name | Presence | Range | Semantics description | Criticality | Assigned Criticality |
|---|---|---|---|---|---|
| >>>E-RAB Level QoS Parameters | M | | comprises necessary QoS parameters | — | — |
| >>>DL Forwarding | O | | | — | — |
| >>>UL GTP Tunnel Endpoint | M | | SGW endpoint of the S1 transport bearer. For delivery of UL PDUs. | — | — |
| >>Selective Handover Bearer Indication | O | Enumerated (true, . . . ) | Indicates that the bearer is handed over via selective Handover | | |
| >RRC Context | M | | Comprises the RRC Handover Preparation Information message as defined in subclause 10.2.2 of TS 36.331 [9]. | — | — |
| >Handover Restriction List | O | | | — | — |
| >Location Reporting Information | O | | Comprises the necessary parameters for location reporting | — | — |
| >Management Based MDT Allowed | O | | | YES | ignore |
| UE History Information | M | | Same definition as in TS 36.413 [4]. | YES | ignore |
| Trace Activation | O | | | YES | ignore |
| SRVCC Operation Possible | O | | | YES | ignore |
| CSG Membership Status | O | | | YES | reject |
| Selective Handover IE | O | Integer (0, 1, 2, . . . ) | '0' indicates only the data radio bearers listed in the E-RAB list are to be handed over, "1" indicates only the signalling radio bearers listed in the E-RAB list are to be handed over, "2" indicates signalling radio bearers and data radio bearers comprised in the E-RAB list are to be handed over | YES | reject |

TABLE 1a

Example of enhanced HANDOVER REQUEST message

| IE/Group Name | Presence | Range | Semantics description | Criticality | Assigned Criticality |
|---|---|---|---|---|---|
| Message Type | M | | | YES | reject |
| Old eNB UE X2AP ID | M | | Allocated at the source eNB | YES | reject |
| Cause | M | | | YES | ignore |
| Target Cell ID | M | | | YES | reject |
| GUMMEI | M | | | YES | reject |
| UE Context Information | | 1 | | YES | reject |
| >MME UE S1AP ID | M | | MME UE S1AP ID allocated at the MME | — | — |
| >UE Security Capabilities | M | | | — | — |
| >AS Security Information | M | | | — | — |
| >UE Aggregate Maximum Bit Rate | M | | | — | — |
| >Subscriber Profile ID for RAT/Frequency priority | O | | | — | — |
| >E-RABs To Be Setup List | | 1 | | — | — |
| >>E-RABs To Be Setup Item | | 1 . . . <maxnoof Bearers> | | EACH | ignore |
| >>>E-RAB ID | M | | | — | — |
| >>>E-RAB Level QoS Parameters | M | | comprises necessary QoS parameters | — | — |
| >>>DL Forwarding | O | | | — | — |
| >>>UL GTP Tunnel Endpoint | M | | SGW endpoint of the S1 transport bearer. For delivery of UL PDUs. | — | — |
| >E-RABs Not To Be Switched in Downlink Item IEs | O | 1 to <maxnoof E-RABs> | Indicates the list of RABs not to be switched, i.e. not subject to selective handover | | |
| >>E-RABs Not To Be Setup Item | | 1 . . . <maxnoof Bearers> | | EACH | ignore |
| >>>E-RAB ID | M | | | — | — |
| >>>E-RAB Level QoS Parameters | M | | comprises necessary QoS parameters | | |
| >RRC Context | M | | Comprises the RRC Handover Preparation Information message as defined in subclause 10.2.2 of TS 36.331 [9]. | — | — |
| >Handover Restriction List | O | | | — | — |

TABLE 1a-continued

Example of enhanced HANDOVER REQUEST message

| IE/Group Name | Presence | Range | Semantics description | Criticality | Assigned Criticality |
|---|---|---|---|---|---|
| >Location Reporting Information | O | | Comprises the necessary parameters for location reporting | — | — |
| >Management Based MDT Allowed | O | | | YES | ignore |
| UE History Information | M | | Same definition as in TS 36.413 [4]. | YES | ignore |
| Trace Activation | O | | | YES | ignore |
| SRVCC Operation Possible | O | | | YES | ignore |
| CSG Membership Status | O | | | YES | reject |
| Selective Handover IE | O | Integer (0, 1, 2, . . . ) | '0' indicates only the data radio bearers listed in the E-RAB list are to be handed over, "1" indicates only the signalling radio bearers listed in the E-RAB list are to be handed over, "2" indicates signalling radio bearers and data radio bearers comprised in the E-RAB list are to be handed over | YES | reject |

A second possibility to communicate that the handover is of the selective kind is by providing all the bearers of the user equipment in the E-RABs to be setup list, but adding one optional IE (e.g. "selective handover") for each bearer indicating whether the concerned bearer is to be handed over or not. This way gives more information to the target than the previous way of including only the bearers to be handed over, as the target will get the entire user equipment context, and there will be no mismatch between the bearers listed in the E-RABs to be setup list and those in the RRC Context, which might lead to some confusion/errors in some implementations.

A third way to communicate selective handovers is to keep the E-RABs to be setup to comprise only the bearers to be handed over (as in the first case), but introduce another optional list (e.g., E-RABs to not to be setup) which comprises the list of bearers that are to be left at the source. This method effectively provides the same detailed information to the target as in the second case.

By listing all the bearers in the HANDOVER REQUEST message, those to be handed over and those not to be handed over, it is also possible to change the anchor node if needed. The anchor in this case would handover also the signalling radio bearers (SRBs) and it will provide to the new anchor all the user equipment context information concerning all the bearers the user equipment has been assigned.

Additionally, the HANDOVER REQUEST may be initiated by an assisting node towards an anchor node in order to handover back some bearers that were previously handed over to the assisting node. As a further option, the assisting node may indicate in the HANDOVER REQUIRED message an indication that the bearers to be handed over should be handed over to a new assisting cell. In the latter case, new information elements need to be added to the HANDOVER REQUEST message in order to specify the identity of the new assisting node where the bearers need to be handed over.

If shall be pointed out that the HANDOVER REQUEST ACKNOWLEDGE may comprise a list of bearers that were successfully setup, for example, an E-RAB Admitted List, and an E-RABs Not Admitted List, i.e., a list of bearers that were not admitted at the assisting node. Upon reception of the HANDOVER REQUEST ACKNOWLEDGE and of the E-RABs Not Admitted List the anchor may decide to maintain the non-admitted bearers active and to keep on serving the user equipment with these bearers traffic.

Once the first selective handover has been carried out between anchor and assisting nodes, there might be the need to hand over more bearers to the assisting cell or there might be the need to handover back some bearers from the assisting node to the anchor. For this purpose the enhanced HANDOVER REQUEST/RESPONSE procedure may be initiated by either the anchor or the assisting node. Due to the presence of the Selective Handover IE, the node receiving subsequent HANDOVER REQUEST messages will understand that they concern a selective handover, i.e., a handover of some user equipment bearers. Therefore, reception of such handover messages after the first selective handover has been performed shall not be interpreted as an error. The extra bearers that need to be handed over from anchor to assisting node or vice versa would be comprised in the E-RABs To Be Setup List IE of the HANDOVER REQUEST, while the HANDOVER REQUEST ACKNOWLEDGE may shall comprise an E-RAB Admitted List and an E-RABs Not Admitted List as specified above.

E-RAB Procedures

According to some of the example embodiments, procedures to setup or tear down or modify bearers at the assisting cell are defined. As the RRC termination point is either in the anchor node or connected to the anchor node, all these processes shall be triggered by the anchor node. For this reason E-RAB Setup, E-RAB Modify and E-RAB Release procedures are defined, according to some of the example embodiments, for use on either the X2 interface or on a new interface.

Figure 19:
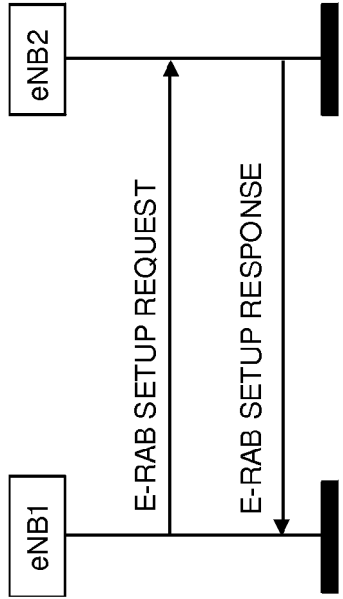
FIG. 19 is a messaging diagram illustrating an E-RAB set up procedure, according to some of the example embodiments.

A general diagram of the E-RAB Setup procedure is shown in FIG. 19. The E-RAB Setup procedure is used after a selective handover has been carried out via handover preparation and handover execution procedures and when additional radio bearers need to be setup at the assisting cell. This procedure is triggered after a decision has been made in the anchor node about whether one or more bearers need setup directly at the assisting cell.

Such a decision may be based on different factors. An example of such a factor may be user equipment radio conditions monitored via a reception of measurement reports provided by the user equipment. A further example may be load related conditions, for example, whether the serving anchor cell is in need to offload traffic to an assisting cell. Yet a further example may be performance related conditions, for example, whether it is more opportune for some bearers to be served by the assisting cell due to the improved performance the assisting node may provide (e.g. in case of bearers with predominant uplink traffic).

In this procedure the anchor node eNB1 sends an E-RAB SETUP REQUEST message to the assisting node eNB2. The E-RAB SETUP REQUEST comprises a list of bearers that are in need to be setup at the assisting node. As a consequence of receiving the E-RAB SETUP REQUEST the assisting node shall reply with an E-RAB SETUP RESPONSE message, which comprises a list of successfully setup bearers and a list of bearers that failed to be setup. If the E-RAB SETUP RESPONSE indicates that some of the bearers to be setup failed to be setup, the anchor node may decide to setup such bearers at the anchor cell.

Table 2 shows examples of IEs that may be comprised in the E-RAB Setup Request message either over the X2 interface or over a new interface. In this list the Transport Layer Address IE represents the IP address of the node where uplink traffic will need to be sent by the assisting eNB. Equivalently, the GTP-TEID IE represents the GTP tunnel endpoint ID of the node terminating the GTP tunnel established with the assisting node. The remaining IEs comprised in the E-RAB SETUP REQUEST message are as defined in 3GPP 36.413.

TABLE 2

E-RAB Setup Request IEs

| IE/Group Name | Presence | Range | Semantics description | Criticality | Assigned Criticality |
|---|---|---|---|---|---|
| Message Type | M | | | YES | reject |
| UE Aggregate Maximum Bit Rate | O | | | YES | reject |
| E-RAB to be Setup List | | 1 | | YES | reject |
| >E-RAB To Be Setup Item IEs | | 1 to <maxnoof E-RABs> | | EACH | reject |
| >>E-RAB ID | M | | | — | |
| >>E-RAB Level QoS Parameters | M | | comprises necessary QoS parameters | — | |
| >>Transport Layer Address | M | | | — | |
| >>GTP-TEID | M | | | — | |
| >>NAS-PDU | M | | | — | |

In Table 3, an example of IEs comprised in the E-RAB Setup Response is shown. The Transport Layer Address IE represents the IP address of the node where downlink traffic will need to be received by the assisting eNB. Equivalently, the GTP-TEID IE represents the GTP tunnel endpoint ID assigned by the assisting node for the GTP tunnel corresponding to the E-RAB. The remaining IEs comprised in the E-RAB SETUP REQUEST message are as defined in 3GPP 36.413.

TABLE 3

E-RAB Setup Response IEs

| IE/Group Name | Presence | Range | Semantics description | Criticality | Assigned Criticality |
|---|---|---|---|---|---|
| Message Type | M | | | YES | reject |
| E-RAB Setup List | | 0 . . . 1 | | YES | ignore |
| >E-RAB Setup Item Ies | | 1 to <maxnoof E-RABs> | | EACH | ignore |
| >>E-RAB ID | M | | | — | |
| >>Transport Layer Address | M | | | — | |
| >>GTP-TEID | M | | | — | |
| E-RAB Failed to Setup List | O | | a value for E-RAB ID shall only be present once in E-RAB Setup List IE + in E-RAB Failed to Setup List IE | YES | ignore |
| Criticality Diagnostics | O | | | YES | ignore |

Note that the E-RAB setup request that is sent from the anchor to an assisting node may be in response to an E-RAB setup request coming from the MME, or any other mobility management node (e.g., SGSN or S4-SGSN). That is, when the network wants to setup a bearer, it may contact the anchor node, and the anchor node, based on the criteria's discussed above, decides to setup the bearer on the anchor link or the assisting link. If the assisting link was chosen, then the anchor sends out the aforementioned E-RAB setup request to the assisting node. Similarly, when the anchor gets an E-RAB setup response to such a request, it forwards the E-RAB setup response towards the network on behalf of the assisting node.

In order to address the cases where bearers are established at the assisting node and need to be modified, E-RAB modify procedures between the anchor node and the assisting node are introduced for application either via X2 interface or via a new interface. The basic procedure is shown in FIG. 20.

Figure 20:
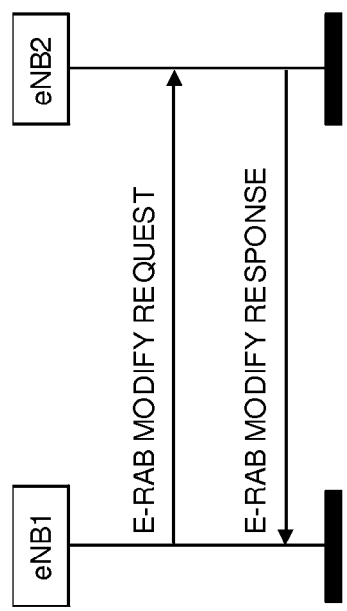
FIG. 20 is a messaging diagram illustrating an E-RAB modify procedure, according to some of the example embodiments.

In FIG. 20 eNB1 is the anchor node and eNB2 is the assisting node. As an example, if the anchor node decides to modify bearers allocated to the assisting node, then it will issue an E-RAB MODIFY REQUEST message. The assisting node will reply with an E-RAB MODIFY RESPONSE message confirming whether the bearer has been successfully modified or whether the modification was not possible.

Table 4 illustrates the IEs that may be comprised in the E-RAB MODIFY REQUEST message. All the IEs are defined as in 3GPP TS36.413.

TABLE 4

E-RAB Modify Request IEs

| IE/Group Name | Presence | Range | Semantics description | Criticality | Assigned Criticality |
|---|---|---|---|---|---|
| Message Type | M | | | YES | reject |
| UE Aggregate Maximum Bit Rate | O | | | YES | reject |
| E-RAB to be Modified List | | 1 | | YES | reject |
| >E-RAB To Be Modified Item IEs | | 1 to <maxnoof E-RABs> | | EACH | reject |
| >>E-RAB ID | M | | | — | |
| >>E-RAB Level QoS Parameters | M | | Comprises necessary QoS parameters | — | |
| >>NAS-PDU | M | | | — | |

Table 5 shows the IEs that could be comprised in the E-RAB MODIFY RESPONSE message. All IEs are defined as in 3GPP TS36.413.

TABLE 5

E-RAB Modify Response IEs

| IE/Group Name | Presence | Range | Semantics description | Criticality | Assigned Criticality |
|---|---|---|---|---|---|
| Message Type | M | | | YES | reject |
| E-RAB Modify List | | 0 . . . 1 | | YES | ignore |
| >E-RAB Modify Item IEs | | 1 to <maxnoof E-RABs> | | EACH | ignore |
| >>E-RABID | M | | | — | |
| E-RAB Failed to Modify List | O | | a value for E-RAB ID shall only be present once in E-RAB Modify List IE + E-RAB Failed to Modify List IE | YES | ignore |

TABLE 5-continued

E-RAB Modify Response IEs

| IE/Group Name | Presence | Range | Semantics description | Criticality | Assigned Criticality |
|---|---|---|---|---|---|
| Criticality Diagnostics | O | | | YES | ignore |

Note that, similar to the setting up of a bearer, the E-RAB MODIFY REQUEST that is sent from the anchor to an assisting node may be in response to an E-RAB MODIFY REQUEST coming from the MME or any other mobility management node (e.g., a SGSN or S4-SGSN). That is, when the network wants to modify a bearer, it may contact the anchor node, and the anchor node, when it finds out that the bearer is actually established on the assisting link, sends out the aforementioned E-RAB MODIFY REQUEST to the assisting node. Similarly, when the anchor gets an E-RAB MODIFY RESPONSE to such a request, it forwards it towards the network on behalf of the assisting node.

Figure 21:
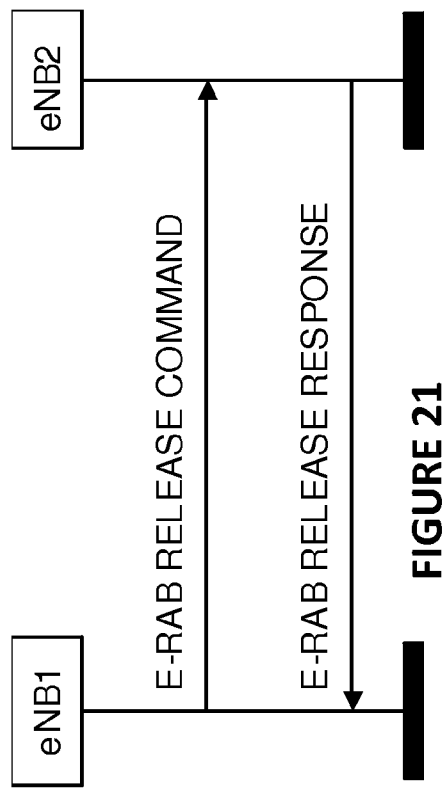
FIG. 21 is a messaging diagram illustrating an E-RAB release procedure, according to some of the example embodiments.

In case some bearers established at an assisting cell need to be removed, E-RAB Remove procedures are needed either via X2 or via a new interface between the anchor and assisting node. FIG. 21 shows an example of such procedure. In this procedure the anchor node, eNB1, takes a decision to remove one or more bearers established in the assisting node and sends the E-RAB RELEASE COMMAND comprising a list of E-RABs to be released. The assisting node, eNB2, replies with the E-RAB RELEASE RESPONSE indicating if the bearers were successfully removed.

Table 6 shows the IEs that could form the E-RAB RELEASE COMMAND, which are all defined in 3GPP TS36.413.

TABLE 6

E-RAB Release Command IEs

| IE/Group Name | Presence | Range | Semantics description | Criticality | Assigned Criticality |
|---|---|---|---|---|---|
| eNB UE S1AP ID | M | | | YES | reject |
| UE Aggregate Maximum Bit Rate | O | | | YES | reject |
| E-RAB To Be Released List | M | | a value for E-RAB ID shall only be present once in E-RAB To Be Released List IE | YES | ignore |
| NAS-PDU | O | | | YES | ignore |

Table 7 shows the IEs that could form the E-RAB RELEASE RESPONSE, which are all defined in 3GPP TS36.413.

TABLE 7

E-RAB Release Command IEs

| IE/Group Name | Presence | Range | Semantics description | Criticality | Assigned Criticality |
|---|---|---|---|---|---|
| eNB UE S1AP ID | M | | | YES | ignore |

TABLE 7-continued

E-RAB Release Command IEs

| IE/Group Name | Presence | Range | Semantics description | Criticality | Assigned Criticality |
|---|---|---|---|---|---|
| E-RAB Release List | | 0 . . . 1 | | YES | ignore |
| >E-RAB Release Item IEs | | 1 to <maxnoof E-RABs> | | EACH | ignore |
| >>E-RAB ID | M | | — | | |
| E-RAB Failed to Release List | O | | a value for E-RAB ID shall only be present once in E-RAB Release List IE + E-RAB Failed to Release List IE | YES | ignore |
| Criticality Diagnostics | O | | | YES | ignore |

It should be appreciated that similar to the setting up and modification of a bearer, the E-RAB RELEASE COMMAND that is sent from the anchor to an assisting node may be in response to an E-RAB RELEASE COMMAND coming from the MME or any other mobility management node (e.g., SGSN or S4-SGSN). That is, when the network wants to release a bearer, it may contact the anchor node, and the anchor node, when it finds out that the bearer is actually established on the assisting link, sends out the aforementioned E-RAB RELEASE COMMAND to the assisting node. Similarly, when the anchor gets an E-RAB RELEASE RESPONSE to such a command, it forwards it towards the network on behalf of the assisting node.

It should also be appreciated that the E-RAB Setup Request, E-RAB Setup Response, E-RAB Modify Request, E-RAB Modify Response, E-RAB Release Request, and E-RAB Release Response messages are already defined over the S1 interface between the eNB and MME. However, according to some of the example embodiments, these messages are proposed for use over interfaces connecting eNBs, which makes the messages applicable to a different scenario and purposes.

In legacy LTE handovers (e.g., full handover procedures), after the completion of the handover at the target (i.e. the target gets the PATH SWITCH REQUEST ACK message from the MME), the target notifies this to the source by sending the UE Context Release message. When the source gets this message, it may release radio and control plane related resources associated to the user equipment context. However, with regard to selective handover, this might not be needed as some of the bearers of the user equipment might still be kept at the source. According to some of the example embodiments, the source eNB, upon the reception of the context release message, will release only the resources associated with those bearers that have been selectively handed over.

According to some of the example embodiments, the procedures needed to learn the neighbour node and/or neighbour cells capability to support selective handovers are provided. Before initiating selective handover, it would be optimal if the source eNB could know whether the target eNB supports selective handover. If such information is available, the source eNB may choose to either trigger a selective handover towards the target or to trigger a legacy X2 based or S1 based handover procedure.

According to some of the example embodiments, an additional attribute, for example called "Selective HO Indication" is configured by the O&M system for each neighbour cell of an eNB during configuration of neighbour relationship table parameters (i.e. in additional to the currently existing "No remove", "No X2" and "No HO" attributes, as specified in TS36.300). This parameter specifies whether the neighbour cell supports selective handover or not.

According to some of the example embodiments, the support for selective handover may be communicated directly between neighbouring eNBs during interface setup procedures. In case of existing X2 interface this may be achieved via inclusion of the Selective Handover Indication IE in the X2 SETUP REQUEST and X2 SETUP RESPONSE messages. The new IE may take values "supported" or "not-supported".

Figure 22:
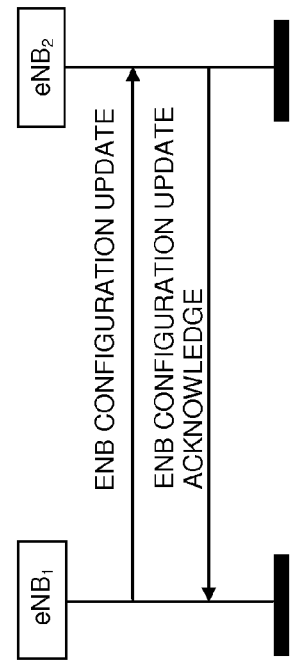
FIG. 22 is a messaging diagram illustrating generalized interface set up procedures, according to some of the example embodiments.
Figure 23:
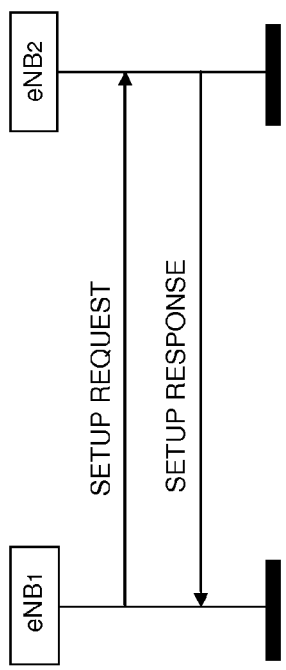
FIG. 23 is a messaging diagram illustrating generalized eNB configuration update procedures, according to some of the example embodiments.

Additionally, the Selective Handover Indication IE may also be comprised in the eNB configuration update procedures. In the example of reusing the X2 interface, this IE may be comprised in the eNB CONFIGURATION UPDATE REQUEST message. In the case of a new interface defined between neighbouring nodes, this embodiment is based on the presence of interface setup procedures and eNB configuration update procedures. Such procedures are shown in the generalised graphs of FIG. 22 and FIG. 23. It shall be noted that the X2 interface has such procedures already specified in 3GPP TS 23.423. However, FIG. 22 and FIG. 23 are interface independent and may be related to any new interface adopted.

Table 8 and Table 9 show the information elements that may constitute an X2 SETUP REQUEST and X2 SETUP RESPONSE message or that could constitute a new interface setup request and response message. According to some of the example embodiments, a Selective Handover Indication IE with corresponding value range may also be provided.

TABLE 8

Generalized list of IEs in interface setup request message

| IE/Group Name | Presence | Range | Semantics description | Criticality | Assigned Criticality |
|---|---|---|---|---|---|
| Message Type | M | | | YES | reject |
| Global eNB ID | M | | | YES | reject |
| Served Cells | | 1 . . . <maxCellineNB> | Complete list of cells served by the eNB | YES | reject |

TABLE 8-continued

Generalized list of IEs in interface setup request message

| IE/Group Name | Presence | Range | Semantics description | Criticality | Assigned Criticality |
|---|---|---|---|---|---|
| >Served Cell Information | M | | | — | — |
| >Neighbour Information | | 0 ... <maxnoofNeighbours> | | — | — |
| >>ECGI | M | | E-UTRAN Cell Global Identifier of the neighbour cell | — | — |
| >>PCI | M | | Physical Cell Identifier of the neighbour cell | — | — |
| >>EARFCN | M | | DL EARFCN for FDD and EARFCN for TDD | — | — |
| >>TAC | O | | Tracking Area Code | YES | ignore |
| GU Group Id List | | 0 ... <maxfPools> | This is all the pools to which the eNB belongs to | GLOBAL | reject |
| >GU Group Id | M | | | — | — |
| Selective Handover Indication | O | ENUMERATED (supported, not-supported, ...) | This IE indicates if the selective handover function is supported | — | — |

TABLE 9

Generalized list of IEs in interface setup response message

| IE/Group Name | Presence | Range | Semantics description | Criticality | Assigned Criticality |
|---|---|---|---|---|---|
| Message Type | M | | | YES | reject |
| Global eNB ID | M | | | YES | reject |
| Served Cells | | 1 ... <maxCellineNB> | Complete list of cells served by the eNB | YES | reject |
| >Served Cell Information | M | | | — | — |
| >Neighbour Information | | 0 ... <maxnoof Neighbours> | | — | — |
| >>ECGI | M | | E-UTRAN Cell Global Identifier of the neighbour cell | — | — |
| >>PCI | M | | Physical Cell Identifier of the neighbour cell | — | — |
| >>EARFCN | M | | DL EARFCN for FDD and EARFCN for TDD | — | — |
| >>TAC | O | | Tracking Area Code | YES | ignore |
| GU Group Id List | | 0 ... <maxPools> | This is all the pools to which the eNB belongs to | GLOBAL | reject |
| >GU Group Id | M | | | — | — |

TABLE 9-continued

Generalized list of IEs in interface setup response message

| IE/Group Name | Presence | Range | Semantics description | Criticality | Assigned Criticality |
|---|---|---|---|---|---|
| Criticality Diagnostics | O | | | YES | ignore |
| Selective Handover Indication | O | ENUMERATED (supported, not-supported, . . . ) | This IE indicates if the selective handover function is supported | — | — |

Table 10 shows the information elements that may constitute an X2: eNB CONFIGURATION UPDATE message or that could constitute a new interface eNB configuration update message. According to some of the example embodiments, a Selective Handover Indication IE with corresponding value range is also provided.

It should be appreciated that in the setup request, setup response and eNB configuration update messages, the Selective Handover Indication IE may alternatively be added as a cell attribute. Namely, the indication may be added for each cell listed in the Served Cell Information IE and for each cell listed in the Neighbour Information IE.

TABLE 10

Generalized list of IEs in eNB configuration update message

| IE/Group Name | Presence | Range | Semantics description | Criticality | Assigned Criticality |
|---|---|---|---|---|---|
| Message Type | M | | | YES | reject |
| Served Cells To Add | | 0 . . . <maxCellineNB> | Complete list of added cells served by the eNB | GLOBAL | reject |
| >Served Cell Information | M | | | — | — |
| >Neighbour Information | | 0 . . . <maxnoof Neighbours> | | — | — |
| >>ECGI | M | | E-UTRAN Cell Global Identifier of the neighbour cell | — | — |
| >>PCI | M | | Physical Cell Identifier of the neighbour cell | — | — |
| >>EARFCN | M | | DL EARFCN for FDD and EARFCN for TDD | — | — |
| >>TAC | O | | Tracking Area Code | YES | ignore |
| Served Cells To Modify | | 0 . . . <maxCellineNB> | Complete list of modified cells served by the eNB | GLOBAL | reject |
| >Old ECGI | M | | This is the old E-UTRAN Cell Global Identifier | — | — |
| >Served Cell Information | M | | | — | — |
| >Neighbour Information | | 0 . . . <maxnoof Neighbours> | | — | — |
| >>ECGI | M | | E-UTRAN Cell Global Identifier of the neighbour cell | — | — |
| >>PCI | M | | Physical Cell Identifier of the neighbour cell | — | — |
| >>EARFCN | M | | DL EARFCN for FDD and EARFCN for TDD | — | — |

TABLE 10-continued

Generalized list of IEs in eNB configuration update message

| IE/Group Name | Presence | Range | Semantics description | Criticality | Assigned Criticality |
|---|---|---|---|---|---|
| >>TAC | O | | Tracking Area Code | YES | ignore |
| >Deactivation Indication | O | | Indicates the concerned cell is switched off for energy saving reasons | YES | ignore |
| Served Cells To Delete | | 0 . . . <maxCellineNB> | Complete list of deleted cells served by the eNB | GLOBAL | reject |
| >Old ECGI | M | | This is the old E-UTRAN Cell Global Identifier of the cell to be deleted | — | — |
| GU Group Id To Add List | | 0 . . . <maxPools> | | GLOBAL | reject |
| >GU Group Id | M | | | — | — |
| GU Group Id To Delete List | | 0 . . . <maxPools> | | GLOBAL | reject |
| >GU Group Id | M | | | — | — |
| Selective Handover Indication | O | ENUMERATED (supported, not-supported, . . . ) | This IE indicates if the selective handover function is supported | — | — |

An alternative way to learn whether a neighbour eNB or cell supports selective handovers is to set criticality to "reject" for the new Selective Handover IE described as part of the handover preparation procedures. Namely if the target does not support selective handovers and cannot decode the Selective Handover IE, the handover procedure will be rejected. The source may take such procedure failure into account to build and maintain information about neighbour nodes not supporting selective handovers.

RRC Messaging

According to some of the example embodiments, new procedures are proposed for the exchange of RRC related information between anchor and assisting eNBs. These procedures are introduced because, as described in previous parts of the example embodiments, it is assumed that the node hosting the RRC protocol termination is either the same node or it is connected to the anchor node. Therefore, it is not possible for the assisting node to directly receive information signalled via the RRC protocol and neither is it possible for the assisting node to configure specific user equipment behaviours at the RRC level. However, it may be beneficial for the assisting node to directly trigger handover procedures towards other neighbour cells. For this reason it would be beneficial to enable the assisting node to receive Measurement Report information reported by the user equipment to the anchor node and to be able to provide measurement configuration to the anchor node, with the objective of signalling such measurement configuration via RRC to the user equipment.

Figure 24:
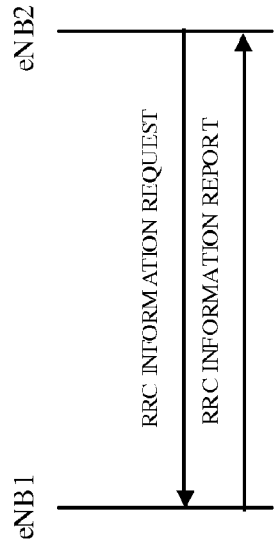
FIG. 24 is a messaging diagram illustrating generalized procedures for reporting RRC related information, according to some of the example embodiments.

In line with the above, the first procedure proposed either for use over the existing X2 interface or for use over a new interface is the RRC Information Report procedure shown in FIG. 24. In the RRC Information Report procedure the anchor node sends relevant RRC information to the assisting node. Relevant RRC information may be Measurement Report messages received from user equipments with a connection in both the anchor node and the assisting node.

Additionally, the RRC INFORMATION REPORT message may also comprise other RRC messages for the purpose of sending such messages from the assisting node as well as from the anchor node. An example could be to provide the content of the RRC Connection Reconfiguration with MobilityControlInfo, for example, message 7 in FIG. 15, in the RRC INFORMATION REPORT message. After receiving this message the assisting node may decide to forward the information to the user equipment, therefore increasing the chances of correct reception of such information by the user equipment.

Figure 25:
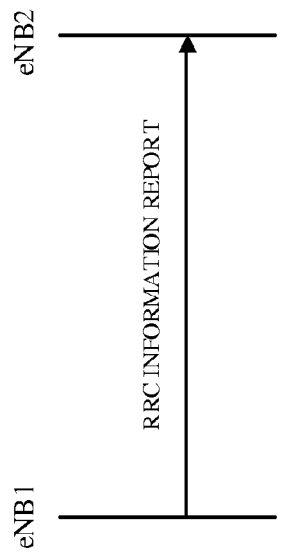
FIG. 25 is a messaging diagram illustrating generalized procedures for requesting and reporting RRC related information, according to some of the example embodiments.

The RRC Information Report message may comprise a container IE similar to the RRC Context IE defined in 3GPP TS36.423, where the IE may comprise the MeasurementReport message as defined in 3GPP TS36.331 as well as other information exchanged over RRC with the user equipment. After receiving the information in the RRC Information Report message the assisting node may take a decision to forward the information to the user equipment or to handover some or all the served user equipment bearers to a neighbour cell. Alternatively, the RRC Information Report procedure may follow a request from the assisting eNB. Such request may be specified in the form of an RRC Information Request message, as shown in FIG. 25.

Figure 26:
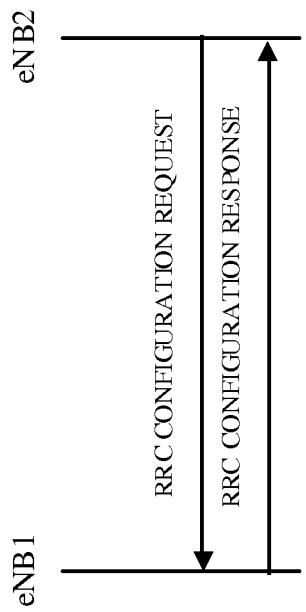
FIG. 26 is messaging diagram illustrating generalized signaling for RRC configuration procedures, according to some of the example embodiments.

The second procedure proposed is the RRC Configuration procedure, which is made of an RRC Configuration Request and an RRC Configuration Response as shown in FIG. 26. In the RRC Configuration Request message the assisting eNB sends a particular RRC configuration that shall be signalled by the anchor eNB to the user equipment. The RRC Configuration Request message may comprise some or all the information elements used in the RRC to configure user equipment measurements as specified in 3GPP TS36.331.

Upon receiving an RRC Configuration Request message, the anchor eNB may decide to accept the RRC configuration and to configure the user equipment according to the information received from the assisting node. In this case, the RRC Configuration Response will be sent from Anchor node to Assisting node. Alternatively, the anchor node may decide to reject the RRC configuration proposed by the assisting node, in which case an RRC Configuration Failure message will be sent from the Anchor node to the Assisting node.

Example Node Configuration

Figure 27:
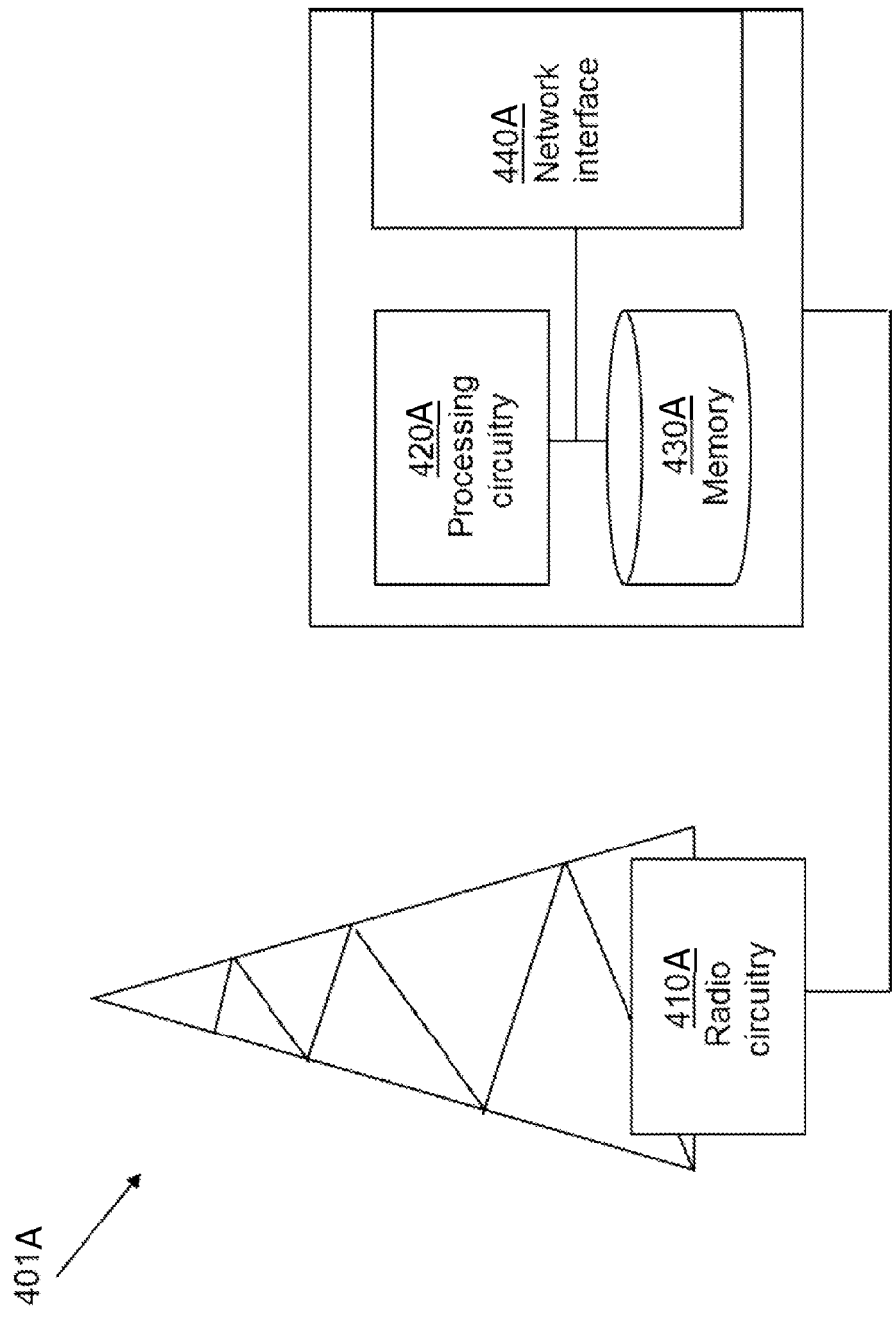
FIG. 27 is an example node configuration of a first base station, according to some of the example embodiments.

FIG. 27 illustrates an example node configuration of a first base station or eNB 401A which may perform some of the example embodiments described herein. It should be appreciated that the base station illustrated in FIG. 27 may be an anchor eNB or assisting eNB unless otherwise specified. The base station 401A may comprise radio circuitry or a communication port 410A that may be configured to receive and/or transmit communication data, instructions, and/or messages. It should be appreciated that the radio circuitry or communication port 410A may be comprised as any number of transceiving, receiving, and/or transmitting units or circuitry. It should further be appreciated that the radio circuitry or communication 410A may be in the form of any input or output communications port known in the art. The radio circuitry or communication 410A may comprise RF circuitry and baseband processing circuitry (not shown).

The base station 401A may also comprise a processing unit or circuitry 420A which may be configured to provide an interface between the first base station and a second base station for providing bearer management functions. The processing circuitry 420A may be any suitable type of computation unit, for example, a microprocessor, digital signal processor (DSP), field programmable gate array (FPGA), or application specific integrated circuit (ASIC), or any other form of circuitry. The base station 401A may further comprise a memory unit or circuitry 430A which may be any suitable type of computer readable memory and may be of volatile and/or non-volatile type. The memory 430A may be configured to store received, transmitted, and/or measured data, device parameters, communication priorities, and/or executable program instructions.

Figure 28:
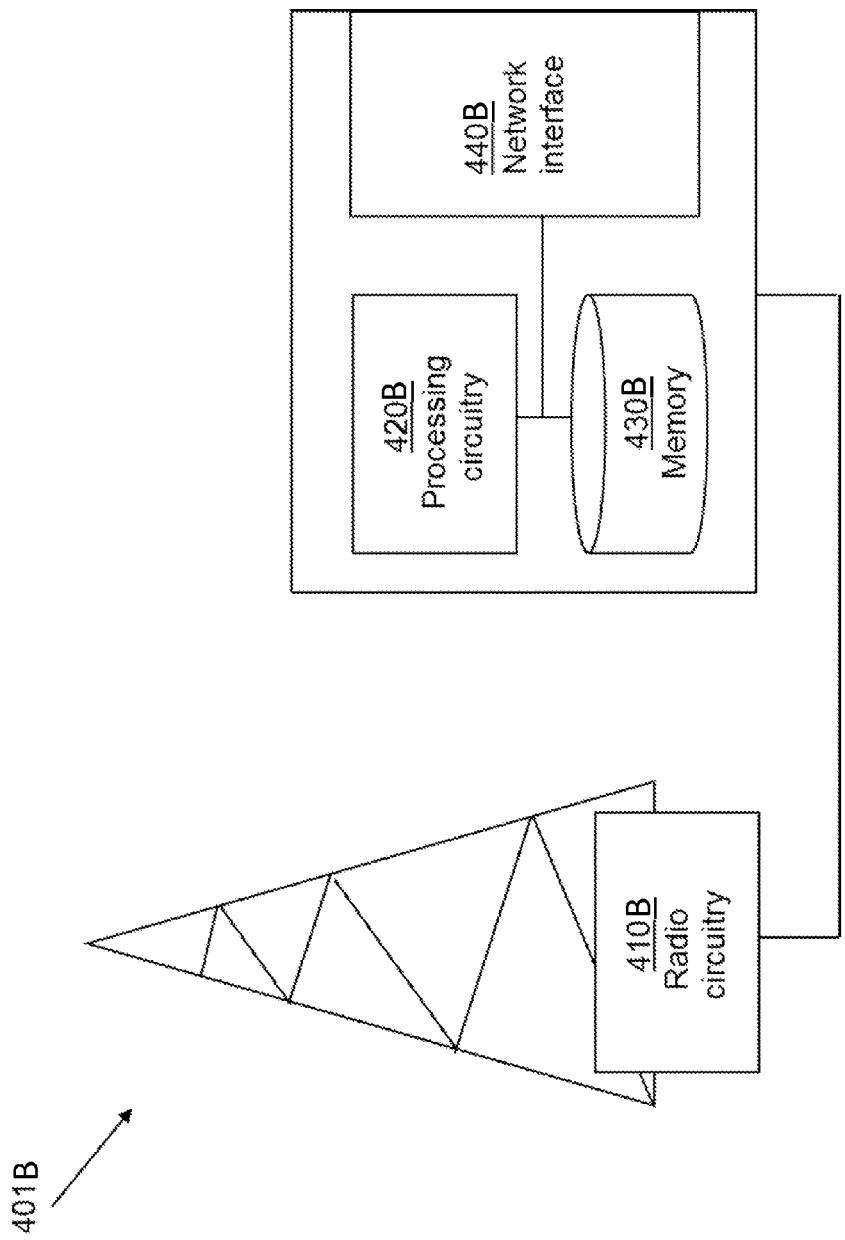
FIG. 28 is an example node configuration of a second base station, according to some of the example embodiments.

FIG. 28 illustrates an example node configuration of a second base station or eNB 401B which may perform some of the example embodiments described herein. It should be appreciated that the base station illustrated in FIG. 28 may be an anchor or assisting eNB unless otherwise specified. The base station 401B may comprise radio circuitry or a communication port 410B that may be configured to receive and/or transmit communication data, instructions, and/or messages. It should be appreciated that the radio circuitry or communication port 410B may be comprised as any number of transceiving, receiving, and/or transmitting units or circuitry. It should further be appreciated that the radio circuitry or communication 410B may be in the form of any input or output communications port known in the art. The radio circuitry or communication 410B may comprise RF circuitry and baseband processing circuitry (not shown).

The base station 401B may also comprise a processing unit or circuitry 420B which may be configured to provide an interface between the first base station and a second base station for providing bearer management functions. The processing circuitry 420B may be any suitable type of computation unit, for example, a microprocessor, digital signal processor (DSP), field programmable gate array (FPGA), or application specific integrated circuit (ASIC), or any other form of circuitry. The base station 401B may further comprise a memory unit or circuitry 430B which may be any suitable type of computer readable memory and may be of volatile and/or non-volatile type. The memory 430B may be configured to store received, transmitted, and/or measured data, device parameters, communication priorities, and/or executable program instructions.

Example Node Operations

Figure 29:
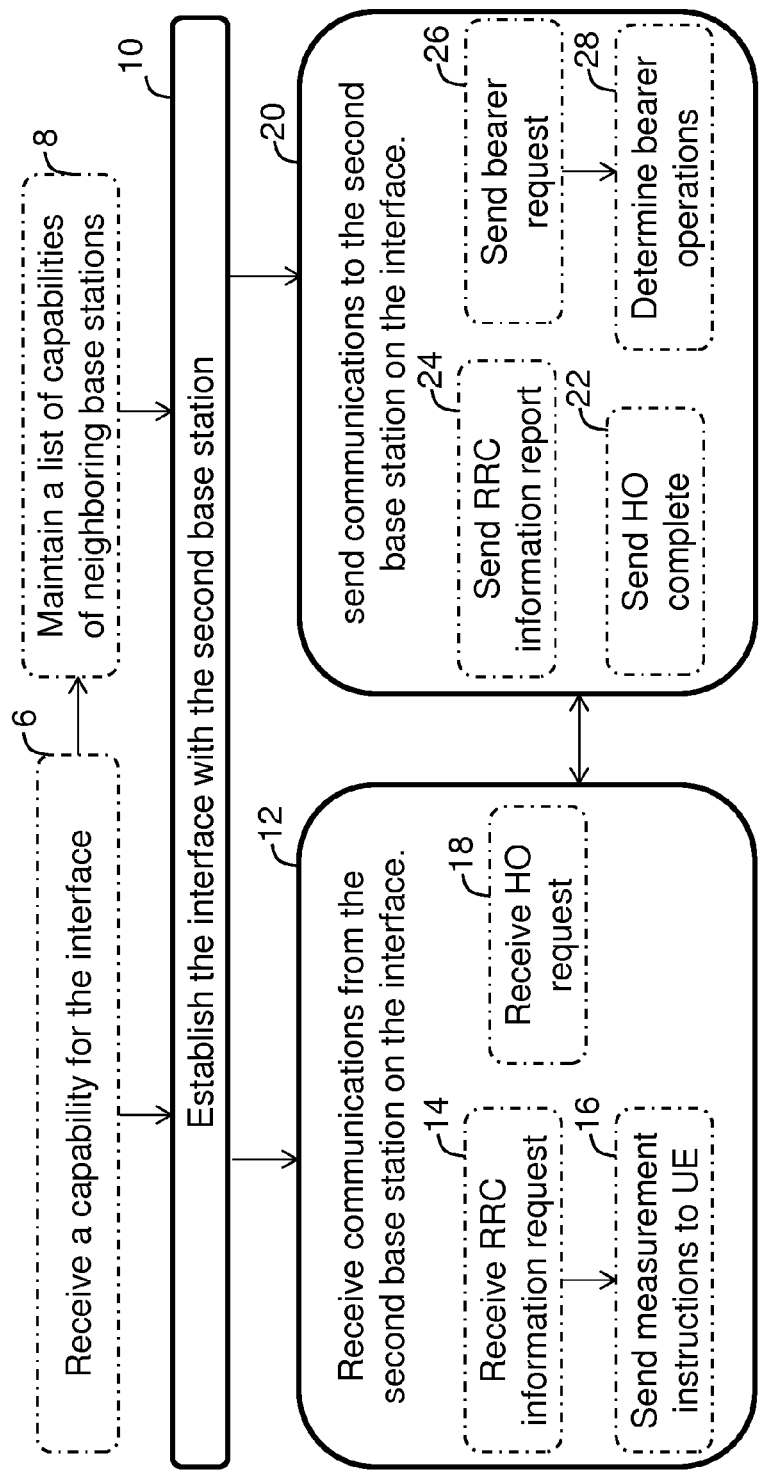
FIG. 29 is a flow diagram depicting example operations which may be taken by the first and second base stations of FIGS. 27 and 28, according to some of the example embodiments.

FIG. 29 is a flow diagram depicting example operations which may be taken by the source base station 401A as described herein to provide an interface between the first base station and a second base station 401B for providing bearer management functions. It should be appreciated that FIG. 29 comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be taken in addition to the operations of the boarder example embodiments. It should be appreciated that these operations need not be performed in order.

Furthermore, it should be appreciated that not all of the operations need to be performed. The example operations may be performed in any order and in any combination. It should also be appreciated that unless otherwise specified, the actions may be performed by an anchor or assisting base station.

Example Operation 6

According to some of the example embodiments, the first base station 401A is configured to receive 6, from the second base station 401B, a capability for accepting communications and/or performing bearer management operations on the interface. The radio circuitry 410A is configured to receive, from the second base station, the capability for accepting communications and/or performing bearer management operations on the interface. It should be appreciated that the term bearer management operations may be related to E-RAB procedures, RRC messaging, handover procedures, interface establishment procedures, or any other operations described herein.

Example Operation 8

According to some of the example embodiments, the receiving 6 may further comprise maintaining 8 a listing of capability statuses of neighbouring base stations. The processing circuitry 420A is configured to maintain the listing of capability statuses of neighbouring base stations.

Operation 10

The first base station 401A is configured to establish 10 the interface with the second base station 401B. The processing circuitry 420A is configured to establish the interface with the second base station. According to some of the example embodiments, the interface is an X2 interface, a newly created interface (e.g., X3), or any other base station to base station interface.

Operation 12

The first base station 401A is further configured to receive 12, from the second base station 401B, communications on the interface for providing bearer management functions for bearers associated with a user equipment 101 in multiple connectivity with at least the first and second base stations. The radio circuitry 410A is configured to receive, from the second base station, communications on the interface for providing bearer management functions for bearers associated with a user equipment in multiple connectivity with at least the first and second base stations. It should be appreciated that the term bearer management operations may be related to E-RAB procedures, RRC messaging, handover procedures, interface establishment procedures, or any other operations described herein.

Example Operation 14

According to some of the example embodiments, the first base station 401A is an anchor base station and the second base station 401B is an assisting base station. In such example embodiments, the receiving 12 may further comprise receiving 14, from the assisting base station 401B, a RRC information request. The radio circuitry 410A is configured to receive, from the assisting base station, the RRC information request.

Example Operation 16

According to some of the example embodiments, the RRC information request comprises measurement configuration instructions for the user equipment 101. In such example embodiments, the receiving 14 may further comprise sending 16, to the user equipment, the measurement configuration instructions. The radio circuitry 410A is configured to send, to the user equipment, the measurement configuration instructions. Example operations 14 and 16 are further described under at least the sub-heading 'RRC messaging'.

Example Operation 18

According to some of the example embodiments, receiving 12 may further comprise receiving 18, from the second base station 401B, a handover request. The radio circuitry 410A may be configured to receive, from the second base station, the handover request.

Operation 20

The first base station 401A is further configured to send 20, to the second base station 401B, communications on the interface for providing bearer management functions for bearers associated with a user equipment in multiple connectivity with at least the first and second base stations. The radio circuitry 410A is configured to send, to the second base station, communications on the interface for providing bearer management functions for bearers associated with a user equipment in multiple connectivity with at least the first and second base stations.

According to some of the example embodiments, the handover request may comprise an indication that a selective handover of the sub-set of bearers of the user equipment is needed. Specifically, the indication specifies that the handover request is for a selective handover.

According to some of the example embodiments, the handover request may comprise an indication of a type of selective handover to be performed. According to some of the example embodiments, the different types of selective handovers may be selective handovers for signal radio bearers, data radio bearers and/or signal and data radio bearers. Example operations 18 and 20 are further described under at least the sub-heading 'Handover messaging'.

Example Operation 22

According to some of the example embodiments, the sending 20 further comprises sending 22, to the second base station 401B, a handover complete message upon a completion of a selective handover of a sub-set of bearers for the user equipment 101. The handover completion message comprises at least one of a RRC complete message, identification for the user equipment, identification for the selective handover procedure, or a result for each bearer of the selective handover. The radio circuitry 410A is configured to send, to the second base station, the handover complete message upon the completion of the selective handover of the sub-set of bearers for the user equipment.

According to some of the example embodiments, the handover completion message may or may not be sent upon the receipt of a handover request message, as described in example operation 18 and illustrated in FIG. 17.

Example Operation 24

According to some of the example embodiments, the first base station 401A is an anchor base station and the second base station 401B is an assisting base station. In such example embodiments, the sending 20 may further comprise sending 24, to the assisting base station, an information report comprising RRC related data. The radio circuitry 410A is configured to send, to the assisting base station, the information report comprising RRC related data. According to some of the example embodiments, the RRC related data may comprise measurement reports provided by the user equipment. Example operations 22 and 24 are further described under at least the sub-heading 'RRC messaging'.

Example Operation 26

According to some of the example embodiments, the first base station 401A is an anchor base station and the second base station 401B is an assisting base station. In such example embodiments, the sending 20 further comprises sending 26, to the assisting base station, a bearer request to establish, modify or release a bearer of the user equipment 101 within the assisting base station. The radio circuitry 410A is configured to send, to the assisting base station, the bearer request to establish, modify or release the bearer of the user equipment within the assisting base station.

Example Operation 28

According to some of the example embodiments, the sending 26 may further comprise determining 28 the need to establish, modify, or release the bearer (as described in example operation 26) based on any one or more of user equipment radio conditions, a load of the anchor and/or assisting base station, or performance related conditions. The processing circuitry 420A is configured to determine the need to establish, modify, or release the bearer based on any one or more of user equipment radio conditions, a load of the anchor and/or assisting base station, or performance related conditions. Example operations 26 and 28 are further described under at least the sub-heading 'E-RAB procedures'.

GENERAL STATEMENTS

It should be noted that although terminology from 3GPP LTE has been used herein to explain the example embodiments, this should not be seen as limiting the scope of the example embodiments to only the aforementioned system. Other wireless systems, comprising HSPA, WCDMA, WiMax, UMB, WiFi and GSM, may also benefit from the example embodiments disclosed herein. It should also be appreciated that the term bearer (pre-existing, primary or auxiliary) represents a Data Radio Bearer (DRB) and/or an EPS Radio Bearer.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

Also note that terminology such as user equipment should be considered as non-limiting. A device or user equipment as the term is used herein, is to be broadly interpreted to comprise a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) user equipment that may combine a cellular radiotelephone with data processing; a personal digital assistant (PDA) that can comprise a radiotelephone or wireless communication system; a laptop; a camera (e.g., video and/or still image camera) having communication ability; and any other computation or communication device capable of transceiving, such as a personal computer, a home entertainment system, a television, etc. It should be appreciated that the term user equipment may also comprise any number of connected devices, wireless terminals or machine-to-machine devices.

The various example embodiments described herein are described in the general context of method steps or processes, which may be implemented in one aspect by a computer program product, embodied in a computer-readable medium, comprising computer-executable instructions, such as program code, executed by computers in networked environments. A computer-readable medium may comprise removable and non-removable storage devices comprising, but not limited to, Read Only Memory (ROM), Random Access Memory (RAM), compact discs (CDs), digital versatile discs (DVD), etc. Generally, program modules may comprise routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A method, in a first base station, for providing an interface between the first base station and a second base station for providing bearer management functions, the first and second base stations comprising an anchor-assisting node relationship and being comprised in a wireless communications network, the method comprising:
    establishing the interface with the second base station; and
    receiving communications from the second base station or sending communications to the second base station, on the interface, for providing bearer management functions for bearers associated with a user equipment in multiple connectivity with at least the first and second base stations;
wherein the first base station is an anchor base station and the second base station is an assisting base station, and wherein the sending comprises sending, to the assisting base station, an information report comprising Radio Resource Control (RRC) related data, the RRC related data comprising measurement reports provided by the user equipment.

2. The method of claim 1, wherein the interface is a base-station-to-base station interface.

3. The method of claim 1, further comprising receiving, from the second base station, a capability for accepting communications on the interface or performing bearer management operations on the interface, or both.

4. The method of claim 3, further comprising maintaining a listing of capability statuses of neighboring base stations, the listing comprising the received capability for accepting communications on the interface or performing bearer management operations on the interface, or both.

5. A method, in a first base station, for providing an interface between the first base station and a second base station for providing bearer management functions, the first and second base stations comprising an anchor-assisting node relationship and being comprised in a wireless communications network, the method comprising:
    establishing the interface with the second base station; and
    receiving communications from the second base station or sending communications to the second base station, on the interface, for providing bearer management functions for bearers associated with a user equipment in multiple connectivity with at least the first and second base stations;
wherein the first base station is an anchor base station and the second base station is an assisting base station, and wherein the receiving further comprises receiving, from the assisting base station, a Radio Resource Control (RRC) information request.

6. The method of claim 5, wherein the RRC information request comprises measurement configuration instructions for the user equipment, the method further comprising sending, to the user equipment, said measurement configuration instructions.

7. The method of claim 1, wherein the sending comprises sending, to the second base station, a handover complete message upon a completion of a selective handover of a sub-set of bearers for the user equipment, said handover complete message comprising at least one of a Radio Resource Control (RRC) complete message, identification for the user equipment, identification for the selective handover procedure, or a result for each bearer of said selective handover.

8. The method of claim 7, wherein the receiving further comprises receiving, from the second base station, a handover request prior to performing the sending of the handover complete message.

9. The method of claim 8, wherein the handover request comprises an indication that a selective handover of the sub-set of bearers of the user equipment is needed.

10. The method of claim 8, wherein the handover request comprises an indication of a type of selective handover to be performed, wherein said type of selective handover is a signal radio bearer, data radio bearer and/or a signal and data radio bearer type of selective handover.

11. The method of claim 1, wherein the first base station is an anchor base station and the second base station is an assisting base station, and wherein the sending further comprises sending, to the assisting base station, a bearer request to establish, modify, or release a bearer of the user equipment within the assisting base station.

12. The method of claim 11, further comprising determining a need to establish, modify, or release said bearer based on any one or more of user equipment radio conditions, a load of the anchor and/or assisting base station, or performance related conditions.

13. A first base station adapted for use in a wireless communications network and for providing an interface between the first base station and a second base station for providing bearer management functions, the first and second base stations comprising an anchor-assisting node relationship, the first base station comprising:
    processing circuitry configured to establish the interface with the second base station; and
    radio circuitry configured to receive communications from the second base station or send communications to the second base station, on the interface, to provide bearer management functions for bearers associated with a user equipment in multiple connectivity with at least the first and second base stations;
wherein the first base station is an anchor base station and the second base station is an assisting base station, and wherein the radio circuitry is configured to send, to the assisting base station, an information report comprising Radio Resource Control (RRC) related data, the RRC related data comprising measurement reports provided by the user equipment.

14. The first base station of claim 13, wherein the interface is a base-station-to-base-station interface.

15. The first base station of claim 13, wherein the radio circuitry is further configured to receive, from the second base station, a capability for accepting communications on the interface or for performing bearer management operations on the interface, or both.

16. The first base station of claim 15, wherein the processing circuitry is further configured to maintain a listing of capability statuses of neighboring base stations, the listing comprising the received capability for accepting communications on the interface or performing bearer management operations on the interface, or both.

17. A method, in a first base station, for providing an interface between the first base station and a second base station for providing bearer management functions, the first and second base stations comprising an anchor-assisting node relationship and being comprised in a wireless communications network, the method comprising:
    establishing the interface with the second base station; and
    receiving communications from the second base station or sending communications to the second base station, on the interface, for providing bearer management functions for bearers associated with a user equipment in multiple connectivity with at least the first and second base stations;
wherein the first base station is an anchor base station and the second base station is an assisting base station, and wherein the radio circuitry is configured to receive, from the assisting base station, a Radio Resource Control (RRC) information request.

18. The first base station of claim 17, wherein the RRC information request comprises measurement configuration instructions for the user equipment, and wherein the radio circuitry is further configured to send, to the user equipment, said measurement configuration instructions.

19. The first base station of claim 13, wherein the radio circuitry is configured to send, to the second base station, a handover complete message upon a completion of a selective handover of a sub-set of bearers for the user equipment, said handover complete message comprising at least one of a Radio Resource Control (RRC) complete message, identification for the user equipment, identification for the selective handover procedure, or a result for each bearer of said selective handover.

20. The first base station of claim 19, wherein the radio circuitry is further configured to receive, from the second base station, a handover request prior to sending the handover complete message.

21. The first base station of claim 20, wherein the handover request comprises an indication that a selective handover of the sub-set of bearers of the user equipment is needed.

22. The first base station of claim 20, wherein the handover request comprises an indication of a type of selective handover to be performed, wherein said type of selective handover is a signal radio bearer, data radio bearer and/or a signal and data radio bearer type of selective handover.

23. The first base station of claim 13, wherein the first base station is an anchor base station and the second base station is an assisting base station, and wherein the radio circuitry is configured to send, to the assisting base station, a bearer request to establish, modify, or release a bearer of the user equipment within the assisting base station.

24. The first base station of claim 23, wherein the processing circuitry is configured to determine a need to establish, modify, or release said bearer based on any one or more of user equipment radio conditions, a load of the anchor and/or assisting base station, or performance related conditions.

* * * * *

UNITED STATES PATENT AND TRADEMARK OFFICE
CERTIFICATE OF CORRECTION

PATENT NO. : 9,462,513 B2  
APPLICATION NO. : 14/009128  
DATED : October 4, 2016  
INVENTOR(S) : Centonza et al.

Page 1 of 1

It is certified that error appears in the above-identified patent and that said Letters Patent is hereby corrected as shown below:

In the Claims

In Column 44, Line 17, in Claim 18, delete "The first base station" and insert -- The method --, therefor.

Signed and Sealed this  
Eighth Day of May, 2018

Andrei Iancu  
*Director of the United States Patent and Trademark Office*